(12) United States Patent
Yavuz et al.

(10) Patent No.: US 11,144,663 B2
(45) Date of Patent: Oct. 12, 2021

(54) METHOD AND SYSTEM FOR SEARCH PATTERN OBLIVIOUS DYNAMIC SYMMETRIC SEARCHABLE ENCRYPTION

(71) Applicant: Robert Bosch GmbH, Stuttgart (DE)

(72) Inventors: Attila Yavuz, Corvallis, OR (US); Jorge Guajardo Merchan, Pittsburgh, PA (US); Thang Hoang, Corvallis, OR (US)

(73) Assignee: Robert Bosch GmbH, Stuttgart (DE)

( * ) Notice: Subject to any disclaimer, the term of this patent is extended or adjusted under 35 U.S.C. 154(b) by 293 days.

(21) Appl. No.: 16/474,712

(22) PCT Filed: Dec. 28, 2017

(86) PCT No.: PCT/EP2017/084686
§ 371 (c)(1),
(2) Date: Jun. 28, 2019

(87) PCT Pub. No.: WO2018/122287
PCT Pub. Date: Jul. 5, 2018

(65) Prior Publication Data
US 2019/0340381 A1    Nov. 7, 2019

Related U.S. Application Data

(60) Provisional application No. 62/440,831, filed on Dec. 30, 2016, provisional application No. 62/440,862, filed on Dec. 30, 2016.

(51) Int. Cl.
*G06F 21/62* (2013.01)
*G06F 16/13* (2019.01)
(Continued)

(52) U.S. Cl.
CPC .......... *G06F 21/6227* (2013.01); *G06F 16/13* (2019.01); *G06F 21/602* (2013.01); *G06F 21/606* (2013.01); *H04L 9/14* (2013.01)

(58) Field of Classification Search
CPC .... G06F 21/6227; G06F 16/13; G06F 21/602; G06F 21/606; H04L 9/14; H04L 9/00
See application file for complete search history.

(56) References Cited

U.S. PATENT DOCUMENTS

| 8,429,421 | B2 * | 4/2013 | Chase | G06F 16/907 713/189 |
|---|---|---|---|---|
| 8,812,867 | B2 * | 8/2014 | Jho | H04L 9/0643 713/189 |

(Continued)

OTHER PUBLICATIONS

Khanh, Dang Tran. "A practical solution to supporting oblivious basic operations on dynamic outsourced search trees." International Journal of Computer Systems Science & Engineering 21.1 (2006): 53-64. (Year: 2006).*

(Continued)

*Primary Examiner* — Robert B Leung
*Assistant Examiner* — Sameera Wickramasuriya
(74) *Attorney, Agent, or Firm* — Maginot, Moore & Beck LLP

(57) ABSTRACT

An oblivious encrypted search and update method includes transmitting encrypted search queries and encrypted file update requests from a trusted client to at least two different untrusted servers, receiving encrypted search entries and encrypted file entries from the untrusted servers, and decrypting the encrypted search entries and encrypted file entries with the trusted client. The trusted client re-encrypts the decrypted entries and transmits re-encrypted entries that were received from a first untrusted server to a second untrusted server and vice versa to provide obliviousness for encrypted keyword searches and encrypted file updates from the trusted client.

10 Claims, 9 Drawing Sheets

(51) Int. Cl.
*G06F 21/60* (2013.01)
*H04L 9/14* (2006.01)

(56) References Cited

U.S. PATENT DOCUMENTS

| | | | | |
|---|---|---|---|---|
| 8,930,691 | B2* | 1/2015 | Kamara | G06F 21/6218 |
| | | | | 713/165 |
| 9,454,673 | B1* | 9/2016 | Sarukkai | H04L 9/0618 |
| 9,633,219 | B2* | 4/2017 | Baessler | H04L 9/0861 |
| 9,679,155 | B1* | 6/2017 | Grubbs | H04L 9/0618 |
| 10,007,803 | B2* | 6/2018 | Kaushik | H04L 63/0428 |
| 10,127,391 | B1* | 11/2018 | Whitmer | G06F 16/2455 |
| 10,176,207 | B1* | 1/2019 | Dawoud | G06F 21/6227 |
| 10,503,730 | B1* | 12/2019 | Speers | G06F 16/2365 |
| 10,833,841 | B2* | 11/2020 | Kerschbaum | G06F 21/6227 |
| 2009/0300351 | A1* | 12/2009 | Lei | G06F 16/951 |
| | | | | 713/165 |
| 2010/0318782 | A1* | 12/2010 | Auradkar | H04L 9/0891 |
| | | | | 713/150 |
| 2011/0110525 | A1* | 5/2011 | Gentry | H04L 9/14 |
| | | | | 380/285 |
| 2012/0078914 | A1* | 3/2012 | Roeder | H04L 9/008 |
| | | | | 707/741 |
| 2013/0010950 | A1* | 1/2013 | Kerschbaum | H04L 9/008 |
| | | | | 380/30 |
| 2013/0046974 | A1* | 2/2013 | Kamara | H04L 9/00 |
| | | | | 713/165 |
| 2014/0281512 | A1* | 9/2014 | Arasu | H04L 63/062 |
| | | | | 713/165 |
| 2014/0344944 | A1* | 11/2014 | Olumofin | G06F 21/6245 |
| | | | | 726/26 |
| 2015/0356314 | A1* | 12/2015 | Kumar | G06F 16/2228 |
| | | | | 713/165 |
| 2016/0246828 | A1* | 8/2016 | Cho | G06F 16/24575 |
| 2017/0262546 | A1* | 9/2017 | Chen | H04L 9/0861 |
| 2017/0277906 | A1* | 9/2017 | Camenisch | G06F 21/6227 |
| 2018/0375652 | A1* | 12/2018 | Karame | H04L 9/30 |

OTHER PUBLICATIONS

Kuzu, Mehmet, Mohammad Saiful Islam, and Murat Kantarcioglu. "Efficient privacy-aware search over encrypted databases." Proceedings of the 4th ACM Conference on Data and Application Security and Privacy. 2014. (Year: 2014).*

Hahn, Florian, and Florian Kerschbaum. "Searchable encryption with secure and efficient updates." Proceedings of the 2014 ACM SIGSAC Conference on Computer and Communications Security. 2014. (Year: 2014).*

Zhang, Rui, et al. "Dynamic and Efficient Private Keyword Search over Inverted Index-Based Encrypted Data." ACM Transactions on Internet Technology (TOIT) 16.3 (2016): 1-20. (Year: 2016).*

International Search Report corresponding to PCT Application No. PCT/EP2017/084686 dated Apr. 4, 2018 (2 pages).

Hoang, et al., "Practical and Secure Dynamic Searchable Encryption via Oblivious Access on Distributed Data Structure," ASCAC 2016, (12 pages).

Orencik, et al., "A Practical and Secure Multi-Keyword Search Method over Encrypted Cloud Data," 2013 IEEE Sixth International Conference on Cloud Computing (8 pages).

Kuzu, et al., "Efficient Similarity Search over Encrypted Data," 2012 IEEE 28th International Conference on Data Engineering (12 pages).

* cited by examiner

FIG. 2

| Scheme | Security | | | | | Performance | Setting |
|---|---|---|---|---|---|---|---|
| | Data structure-access pattern | | Update leakage | Query result size | Statistical attacks | End-to-end crypto delay[†] | # Server |
| | 1-time repetition of an unlinkable query | Full query linkability[§] | | | | | |
| *Traditional DSSE* [13],[17],[4],[26] | ✗ | ✗ | ✗ | ✗ | ✗ | < 0.2 s | 1 |
| ODICT | ✓ | ✓ | ✗* | ✗* | ✓ | 192.2 s* | 1 |
| OMAT | ✓ | ✓ | ✓ | ✓ | ✓ | 767.5 s | 1 |
| DOD-DSSE | ✗[‡] | ✓ | ✓ | ✓ | ✓ | 1.1 s | 2 |

METHOD AND SYSTEM FOR SEARCH PATTERN OBLIVIOUS DYNAMIC SYMMETRIC SEARCHABLE ENCRYPTION

CLAIM OF PRIORITY

This application is a 35 U.S.C. § 371 National Stage Application of PCT/EP2017/084749, filed on Dec. 27, 2018, which claims the benefit of U.S. Provisional Application No. 62/440,831, which is entitled "Search Pattern Oblivious Dynamic Symmetric Searchable Encryption Schemes," and was filed on Dec. 30, 2016, the entire contents of which are hereby expressly incorporated herein by reference, and also claims the benefit of U.S. Provisional Application No. 62/440,862, which is entitled "Practical and Secure Dynamic Searchable Encryption via Oblivious Access on Distributed Data Structure," and was filed on Dec. 30, 2016, the entire contents of which are hereby expressly incorporated by reference herein.

FIELD

This disclosure relates generally to the fields of information security, and, more particularly, to systems and methods that search data within an encrypted set of data files.

BACKGROUND

Methods for performing searches of encrypted data that do not compromise the confidentiality of the encrypted data are known to the art. For example, in one common configuration a server computing device stores a large number of encrypted data files with an associated encrypted search index. One or more client computing devices make search requests to the server using encrypted representations of search keyword terms that may be present in at least one of the encrypted files. Symmetric Searchable Encryption (SSE) is one method for performing searches in an encrypted search index that enables a client computing device that has access to a symmetric cryptographic key to perform searches for specific terms in the encrypted search index that is stored in the server. The server, however, only receives the encrypted search terms and cannot identify the content of the search terms based on the communications that are received from the trusted client because the server does not have access to the (secret) cryptographic key required to decrypt the search terms. Dynamic-SSE (DSSE) systems are SSE systems that also enable updates to the encrypted search index that is stored on a server when, for example, a client modifies the keywords that are stored in a file, adds a new file, or deletes an existing file. In the context of this disclosure, a reference to an SSE method or system equally refers to a DSSE method or system.

Existing searchable encryption systems enable a client to search for a specific term or "keyword" in an encrypted search index and to perform updates to the encrypted information to reflect modifications of encrypted files. However, the server can still keep track of the encrypted search and file update operations from the trusted client to determine the relative frequency of how often the trusted client searches for keywords and updates various encrypted files. Additionally, the server can track keyword searches to determine which keywords the trusted client includes in searches on a frequent basis, even if the server cannot determine the decrypted keyword itself. Similarly, the server can track file updates to determine encrypted files that receive frequent updates. An "oblivious" embodiment prevents, either completely or partially, a server from being able if the trusted client is performing searches or updates and to prevent the server from tracking patterns of searches for individual keywords and updates to individual files.

One set of solutions that are known to that address privacy of access to memory is referred to as "Oblivious Random Access Memory" (ORAM), which enables oblivious access to encrypted data where an untrusted computer that can observe data access operations cannot effectively determine the actions of a trusted computing device. However, existing ORAM solutions present practical issues to an efficient operation of a search system because the ORAM solutions require the trusted client to retrieve a large set of all the encrypted data of interest to the trusted client, decrypt all of the encrypted data, perform any operations of interest, and then encrypt the entire set of data for transmission back to the server in a manner that prevents the server from determining the operations that the trusted client performed with the encrypted data. The existing ORAM systems are not practical for high-speed searches and updates of large encrypted search indices. Consequently, searchable cryptographic systems that provide obliviousness and efficient keyword search and file update operations would be beneficial.

SUMMARY

In one embodiment, method for searching and updating encrypted data has been developed. The method includes generating, with a trusted client, a first encrypted search query for a first keyword and a first encrypted file update request for a first encrypted file, generating, with the trusted client, a second encrypted search query for a second keyword that is different than the first keyword and a second encrypted file update request for a second encrypted file that is different than the first encrypted file, transmitting, with the trusted client, the first encrypted search query and the first file update request to a first untrusted server, transmitting, with the trusted client, the second encrypted search query and the second encrypted file update request to a second untrusted server, the second untrusted server being different than the first untrusted server, receiving, with the trusted client, a first encrypted search entry corresponding to the first encrypted search query and a second encrypted file entry corresponding to the first file update request from the first untrusted server, receiving, with the trusted client, a second encrypted search entry corresponding to the second encrypted search query and a second encrypted file entry corresponding to the second encrypted file update request from the second untrusted server, decrypting, with the trusted client, the first encrypted search entry and the first encrypted file entry using a plurality of cryptographic keys associated with the first untrusted server to generate a first decrypted search entry and a first decrypted file entry, decrypting, with the trusted client, the second encrypted search entry and the second encrypted file entry using a plurality of cryptographic keys associated with the second untrusted server to generate a second decrypted search entry and a second decrypted file entry, generating, with the trusted client, a first re-encrypted search entry corresponding to the first keyword based on the first decrypted search entry and a first re-encrypted file entry corresponding to the first file identifier based on the first decrypted file entry using the plurality of cryptographic keys associated with the second untrusted server, generating, with the trusted client, a second re-encrypted search entry corresponding to the second keyword based on the second decrypted search entry and a second re-encrypted file entry corresponding to the second file identifier based on the second decrypted file entry using the plurality of cryptographic keys associated with the first untrusted server, transmitting, with the trusted client, the second re-encrypted search entry and the second re-encrypted file entry to the first untrusted server to update a first encrypted search index stored in the first untrusted server, and transmitting, with the trusted client, the first re-encrypted search entry and the first re-encrypted file entry to the second untrusted server to update a second encrypted search index stored in the second untrusted server.

In a further embodiment, the method includes generating, with the trusted client, a third encrypted search query for a third keyword that is different than the first keyword and the second keyword and a third encrypted file update request for a third encrypted file that is different than the first encrypted file and the second encrypted file, generating, with the trusted client, a fourth encrypted search query for a fourth keyword that is different than the first keyword, the second keyword, and the third keyword and a fourth encrypted file update request for a fourth encrypted file that is different than the first encrypted file, the second encrypted file, and the third encrypted file, transmitting, with the trusted client, the third encrypted search query and the third encrypted file update request to the first untrusted server with the first encrypted search query and the first file update request, transmitting, with the trusted client, the fourth encrypted search query and the fourth encrypted file update request to the second untrusted server with the second encrypted search query and the second encrypted file update request, receiving, with the trusted client, a third encrypted search entry corresponding to the third encrypted search query and a third encrypted file entry corresponding to the third file update request from the first untrusted server, receiving, with the trusted client, a fourth encrypted search entry corresponding to the fourth encrypted search query and a fourth encrypted file entry corresponding to the fourth file update request from the second untrusted server, decrypting, with the trusted client, the third encrypted search entry and the third encrypted file entry using the plurality of cryptographic keys associated with the first untrusted server to generate a third decrypted search entry and a third decrypted file entry, decrypting, with the trusted client, the fourth encrypted search entry and the fourth encrypted file entry using a plurality of cryptographic keys associated with the second untrusted server to generate a fourth decrypted search entry and a fourth decrypted file entry, generating, with the trusted client, a third re-encrypted search entry corresponding to the third keyword based on the third decrypted search entry and a third re-encrypted file entry corresponding to the third file identifier based on the third decrypted file entry using the plurality of cryptographic keys associated with the second untrusted server, generating, with the trusted client, a fourth re-encrypted search entry corresponding to the fourth keyword based on the fourth decrypted search entry and a fourth re-encrypted file entry corresponding to the fourth file identifier based on the fourth decrypted file entry using the plurality of cryptographic keys associated with the first untrusted server, transmitting, with the trusted client, the third re-encrypted search entry and the third re-encrypted file entry to the second untrusted server with the first re-encrypted search entry and the first re-encrypted file entry to update the second encrypted search index stored in the second untrusted server, and transmitting, with the trusted client, the fourth re-encrypted search entry and the fourth re-encrypted file entry to the first untrusted server with the second re-encrypted search entry and the second re-encrypted file entry to update the first encrypted search index stored in the first untrusted server.

In a further embodiment, the method includes updating, with the trusted client, a counter stored in an index in a memory of the trusted client, generating, with the trusted client, a first updated encryption key corresponding to the first keyword based on a symmetric key associated with the second untrusted server, a hash of the first keyword, and the counter, generating, with the trusted client, a second updated encryption key corresponding to the second keyword based on a symmetric key associated with the first untrusted server, a hash of the second keyword, and the updated second keyword counter, generating, with the trusted client, the first re-encrypted search entry corresponding to the first keyword based on the first decrypted search entry using the first updated encryption key, and generating, with the trusted client, the second re-encrypted search entry corresponding to the second keyword based on the second decrypted search entry using the second updated encryption key.

In a further embodiment, the method includes generating, with the trusted client, the first re-encrypted file entry corresponding to the first keyword based on the first decrypted file entry and the first updated file counter using the plurality of cryptographic keys associated with the second untrusted server, the plurality of cryptographic keys associated with the second untrusted server including the first updated encryption key, and generating, with the trusted client, the second re-encrypted file entry corresponding to the second keyword based on the second decrypted file entry and the second updated file counter using the plurality of cryptographic keys associated with the first untrusted server, the plurality of cryptographic keys associated with the first untrusted server including the second updated encryption key.

In a further embodiment, the method includes generating, with the trusted client, the first encrypted search query including a first row identifier of a first row in the first encrypted search index stored in the first untrusted server corresponding to the first keyword based on an index stored in the memory of the trusted client, generating, with the trusted client, the second encrypted search query including a second row identifier of a second row in the encrypted search index stored in the second untrusted server corresponding to the second keyword based on the index stored in the memory of the trusted client, generating, with the trusted client, the first encrypted file update request including a first column identifier of a first column in the first encrypted search index stored in the first untrusted server corresponding to the first file identifier based on the index stored in the memory of the trusted client, and generating, with the trusted client, the second encrypted file update request including a second column identifier of a second column in the second encrypted search index stored in the second untrusted server corresponding to the second file identifier based on the index stored in the memory of the trusted client.

In a further embodiment, the method includes transmitting, with the trusted client, the second re-encrypted search entry to the first untrusted server to be stored in a randomly selected row in the first encrypted search index, an identifier of the randomly selected row being stored in an index stored in a memory of the trusted client to enable the trusted client to access the second re-encrypted search entry in a subsequent encrypted search query, and transmitting, with the trusted client, the second re-encrypted file entry to the first untrusted server to be stored in a randomly selected column in the first encrypted search index, an identifier of the randomly selected column being stored in the index of the trusted client to enable the trusted client to access the second re-encrypted file entry in a subsequent encrypted file update request.

In a further embodiment, the method includes modifying, with the trusted client, first decrypted file entry to add or remove at least one keyword from the first decrypted file entry corresponding to a modification of file that corresponds to the first file identifier prior to generating the first re-encrypted file entry.

In a further embodiment, the method includes identifying, with the trusted client, an identifier of an encrypted file that contains the first keyword based on the first decrypted response, transmitting, with the trusted client, a request for the encrypted file to a third untrusted server, receiving, with the trusted client, the encrypted file from the third untrusted server, and decrypting, with a third cryptographic key stored in the memory of the trusted client, the encrypted file.

In a further embodiment, the third untrusted server is different than either of the first untrusted server or the second untrusted server.

In another embodiment, a trusted client computing device that is configured to search and update encrypted data has been developed. The trusted client computing device includes memory configured to store an index, a network interface device configured to transmit data to and receive data from a first untrusted server and a second untrusted server, and a processor operatively connected to the memory and the network interface. The processor is configured to generate a first encrypted search query for a first keyword based on an entry in the index stored in the memory corresponding to the first keyword and a first encrypted file update request for a first encrypted file based on an entry in the index stored in the memory corresponding to the first encrypted file, generate a second encrypted search query for a second keyword based on an entry in the index stored in the memory corresponding to the second keyword, the second keyword being different than the first keyword, and a second encrypted file update request for a second encrypted file based on an entry in the index stored in the memory corresponding to the second encrypted file, the second encrypted file being different than the first encrypted file, transmit the first encrypted search query and the first file update request to a first untrusted server, transmit the second encrypted search query and the second encrypted file update request to a second untrusted server, the second untrusted server being different than the first untrusted server, receive a first encrypted search entry corresponding to the first encrypted search query and a second encrypted file entry corresponding to the first file update request from the first untrusted server, receive a second encrypted search entry corresponding to the second encrypted search query and a second encrypted file entry corresponding to the second encrypted file update request from the second untrusted server, decrypt the first encrypted search entry and the first encrypted file entry using a plurality of cryptographic keys associated with the first untrusted server to generate a first decrypted search entry and a first decrypted file entry, decrypt the second encrypted search entry and the second encrypted file entry using a plurality of cryptographic keys associated with the second untrusted server to generate a second decrypted search entry and a second decrypted file entry, generate a first re-encrypted search entry corresponding to the first keyword based on the first decrypted search entry and a first re-encrypted file entry corresponding to the first file identifier based on the first decrypted file entry using the plurality of cryptographic keys associated with the second untrusted server, generate a second re-encrypted search entry corresponding to the second keyword based on the second decrypted search entry and a second re-encrypted file entry corresponding to the second file identifier based on the second decrypted file entry using the plurality of cryptographic keys associated with the first untrusted server, transmit the second re-encrypted search entry and the second re-encrypted file entry to the first untrusted server to update a first encrypted search index stored in the first untrusted server, and transmit the first re-encrypted search entry and the first re-encrypted file entry to the second untrusted server to update a second encrypted search index stored in the second untrusted server.

BRIEF DESCRIPTION OF THE DRAWINGS

FIG. 2 is a diagram depicting two encrypted search indices that are stored in the memories of two different untrusted servers in the system of FIG. 1.

FIG. 6C is a chart graph depicting the obliviousness properties and performance levels of one embodiment of the systems and methods described herein compared to prior art DSSE and ORAM systems.

DETAILED DESCRIPTION

Figure 1:
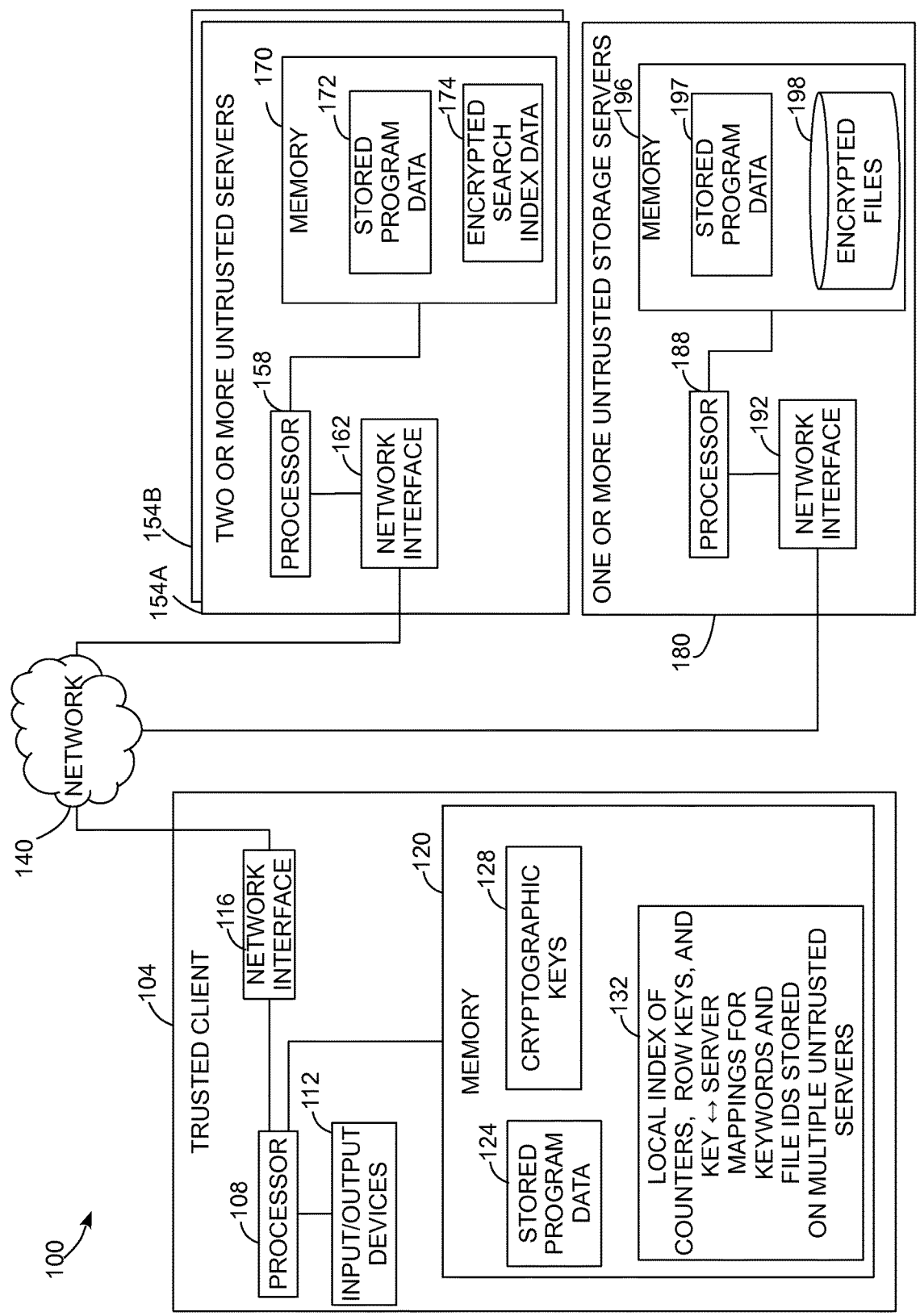
FIG. 1 is a schematic diagram of a system that implements a Distributed Oblivious Data structure Dynamic Searchable Symmetric Encryption (DOD-DSSE) to enables a trusted client to perform oblivious keyword search and file update operations.

For the purposes of promoting an understanding of the principles of the embodiments described herein, reference is now made to the drawings and descriptions in the following written specification. No limitation to the scope of the subject matter is intended by the references. This patent also includes any alterations and modifications to the illustrated embodiments and includes further applications of the principles of the described embodiments as would normally occur to one skilled in the art to which this document pertains.

Definitions that pertain to the systems and methods described herein are set forth below. As used herein, the term "file" refers to any set of structured data that can be encrypted and stored in the memory of an untrusted server computing device. Examples of files include human or machine readable text and binary data, image data, video data, audio data, and other documents that are stored in a filesystem of a digital computing device. Additional examples of files include, for examples, individual rows or other subsets of tables that are stored within a relational database or other objects in a structured data store.

As used herein, the term "keyword" refers to a set of data corresponding to a value that is contained in one or more files. A "plaintext" or "unencrypted" keyword refers to the value itself in a machine or human readable format while a "ciphertext" or "encrypted" keyword refers to a set of encrypted data that are generated using the value and a cryptographic key using a predetermined encryption process. As is described in more detail below, a server computing device that stores encrypted data receives a search query from a client computing device that corresponds to at least one keyword. The server computing device retrieves file identifiers for encrypted files that contain the keyword using encrypted search indices stored in the memories of two or more untrusted servers. The file identifiers correspond to encrypted files that include the value corresponding to the encrypted keyword.

As used herein, the term "oblivious" refers to a property of a search operation or a data access operation in which the operation, when performed by a client, does not "leak" information to a server computing device that stores at least one of an encrypted search index that includes keywords stored in encrypted data files or in an access operation that accesses the contents of one or more encrypted files. For example, as described above, many existing dynamic searchable encryption scheme (DSSE) implementations can "leak" information when the trusted client performs a search for the same keyword or accesses the same encrypted file multiple times. Even though the server does not directly receive the plaintext of the search keyword or the decrypted file, the frequency with which a client searches for different encrypted keywords and accesses different encrypted data files can still leak important information to the potentially untrusted server. To cite just one example, frequency analysis techniques that are known to the art could be used to produce educated guesses about the plaintext contents of keywords and the contents of encrypted files given some general background knowledge about the searches and the contents of the files (e.g. that the searches are for words in the English language and that the plaintext of the encrypted files include English text). Even if the analysis does not directly leak the plaintext contents of keywords or encrypted files, an attacker who can analyze the search and access patterns to encrypted search index and encrypted file data can still determine the relative importance of certain search keywords and files based on the frequency of search and file access operations even if the attacker cannot directly determine the plaintext contents of the keywords and files. The methods and systems described herein enable DSSE with improve obliviousness that reduces or eliminates the data leakage that occurs during both searching operations for keywords stored in encrypted indices that are stored in potentially untrusted servers and for access operations that access the contents of the encrypted files that include the keywords in an encrypted form that are also stored in the untrusted servers.

One specific oblivious property described herein is "keyword search and file update obliviousness," which refers to the inability of an untrusted server that receives keyword search and file update requests from a trusted client to determine if the trusted client is actually performing a file search operation, a file update operation, or is actually performing both operations. Another specific obliviousness property described herein is "pattern obliviousness" that prevents an untrusted server from tracking the patterns of keywords that the trusted client uses in multiple search queries or from tracking the patterns of encrypted files that the trusted client updates in multiple encrypted file update operations. Search pattern obliviousness refers to the ability to completely or at least partially prevent the untrusted server from tracking when the trusted client searches for specific keywords, even if the untrusted server does not have access to the plaintext search keyword. Update pattern obliviousness refers to the ability to completely or at least partially prevent the untrusted server from tracking when the trusted client performs a file update operation for a specific file, even if the untrusted server does not have access to the plaintext file or to the specific updates that are made to the file. As described below, the embodiments herein provide different levels of search pattern obliviousness and file update obliviousness depending upon the actions of untrusted servers.

This disclosure uses the following notational conventions to describe the embodiments herein. The operators $\|$ and $|x|$ denote the concatenation operation and the bit length of variable x, respectively. The form $$x \xleftarrow{S} S$$

denotes that variable x is randomly and uniformly selected from the numeric set S. In the embodiments described herein, numbers are formed from a series of binary bits from the simple binary set $\{0, 1\}$ where larger numbers are represented as a series of bits in a manner that is well-known in the field of digital computing systems. A randomly generated integer with 1 bits is defined as:

$$(x_0, \ldots, x_1) \xleftarrow{S} S$$

where each bit is selected randomly and independently from the binary set $S=\{0, 1\}$ as:

$$\left(x_0 \xleftarrow{S} S, \ldots, x_1 \xleftarrow{S} S\right).$$

One random integer that is described in the context of a cryptographic system is the security parameter K that a client generates with a comparatively large number of bits (e.g. 128 bits or 256 bits) that serves as a basis for a secret symmetric cryptographic key, either directly or as an input to a key generation function, to enable the trusted client to perform the symmetric cryptographic operations described herein. In particular, the random operations described herein when performed by a client computing device cannot be reproduced by an untrusted computing device, including the servers described herein or third-party attackers, which prevents an attacker from reconstructing the security parameter K or any cryptographic keys that are derived from the security parameter K.

$\varepsilon$=(Enc; Dec; Gen) refers to an IND-CPA secure symmetric key encryption scheme, That implements three functions: $k_1 \leftarrow \varepsilon\text{Gen}(1^K)$ is a probabilistic polynomial time (PPT) algorithm that takes a security parameter K and returns a secret key $k_1$ (although in some embodiments the parameter K may be suitable to act as the secret key $k_1$ directly); $c \leftarrow \varepsilon.\text{Enc}_{k_1}(M)$ takes secret key $k_1$ and a plaintext message M, and returns a ciphertext c. In the embodiments described herein, the message M can be any set of data that is encoded in binary or another suitable encoding for encryption and decryption including a keyword or a file. In particular, the message M could be a single bit (0 or 1 value) of data that is concatenated with one or more numeric counter values to encrypt or decrypt a single element in an encrypted search table. M←ε.$\text{Dec}_{k1}$(c) is a deterministic algorithm that takes $k_1$ and the ciphertext c, and returns the plaintext M if $k_1$ was the key that was used to encrypt the ciphertext c. One practical example of a suitable symmetric key encryption scheme that is known to the art is the advanced encryption system (AES) scheme. As described in more detail below, the trusted client computing device generates multiple symmetric encryption/decryption keys that are stored only in the memory of the trusted client computing device and are not shared with any of the server computing devices or other untrusted computing devices.

The function H(x) represents a cryptographically secure hash function, with one example that is known to the art being SHA-256, that takes as input a data value x and returns a fixed-length hash output $\text{Hash}_x$←H(x) where H(x). H(x) is referred to as a "trapdoor function" with pre-image resistance meaning that given the output value $\text{Hash}_x$ there is no practical computational operation that can reproduce the original input x assuming the original input x is not selected from a limited subset of predetermined values (e.g. assuming x is not a simple word in a language that is susceptible to the detection via rainbow tables as is known in the art). Additionally, practical cryptographically secure hash functions that are known to the art also provide collision resistance, which is to say that given a hash value $\text{Hash}_x$ it is impractical to compute an input that is different than the original value x that will also produce the same hash output $\text{Hash}_x$.

FIG. 1 depicts one embodiment of a system 100 that enables a trusted client to perform oblivious encrypted search and encrypted file update operations using multiple untrusted servers that implement Distributed Oblivious Data structure-Dynamic Searchable Symmetric Encryption (DOD-DSSE). The system 100 includes a trusted client 104, which is also referred to as a "client" or "trusted client computing device" and a plurality of untrusted servers 154A and 154B, which are also referred to as "servers" or "untrusted server computing devices", and an untrusted file server 180, which is another untrusted server computing device that stores encrypted file data. The illustrative example of FIG. 1 includes two servers 154A and 154B that each stores an encrypted search index 174 in a memory 170. The trusted client 104 is communicatively connected to the untrusted servers 154A and 154B through a data network 140. The data network 140 is, for example, a local area network (LAN), a wide area network (WAN), or a combination of two or more LAN and WAN networks that enables bi-directional communication between the trusted client 104 and untrusted servers 154A and 154B. In other embodiments, however, the network 140 could be an I/O channel that connects multiple computing devices directly via, for example, a universal serial bus (USB) connection or other suitable peripheral interconnection standard. More generally, the network 140 provides physical and logical separation required to prevent the processor 158 in either of the untrusted servers 154A and 154B from accessing the cryptographic keys 128 or other non-public data that are stored in the memory 120 of the client computing device 104.

In the system 100, the trusted client 104 is a "trusted" computing device meaning that the trusted client 104 has access to cryptographic keys 128 that are described in more detail below. The cryptographic keys 128 enable the trusted client 104 to encrypt data including both files and search index data that are used to search for keywords within encrypted files, to decrypt any of the encrypted data from encrypted search entries or from encrypted files, and to generate updated encrypted search entries and encrypted files. The untrusted servers 154A, 154B, and 180 are considered to be "untrusted" in that the untrusted servers 154A, 154B, and 180 do not have access to the cryptographic keys 128 and the servers 154A, 154B, and 180 should not gain access to the plaintext (unencrypted) data in either of an encrypted search index 174 or encrypted file data 198. During the search operations that are described herein, the untrusted servers 154A and 154B receive search query messages that are from the trusted client 104 included encrypted keywords and transmits encrypted search results and optionally encrypted data files to the trusted client 104 through the data network 140. However, the search operations prevent the untrusted servers 154A and 154B from identifying the plaintext contents of either the search keywords used in the secure search process or the plaintext contents of any of the encrypted data files.

The trusted client computing device 104 is a digital computing device that includes a processor 108, one or more input/output (I/O) devices 112, a network interface device 116, and a memory 120. The processor 108 is a digital logic device that includes, for example, one or more central processing unit (CPU) cores, graphical processing unit (GPU) cores, digital signal processing (DSP) units, and the like. In some embodiments the processor 108 includes multiple discrete processing devices, such as separate CPU and GPU components, while in other embodiments the processing devices are integrated into a single digital logic device in a System on a Chip (SoC) configuration. The I/O devices 112 include, for example, keyboards, mice, touch input devices, speech input devices, and audio/video output devices that enable a user to enter commands to control the trusted client 104 and receive output information from the trusted client 104. In particular, the trusted client 104 performs searches in the search index data 174 stored in the untrusted servers 174A and 174B that correspond to the encrypted data files that are stored in the untrusted server 180, and the I/O devices 112 enable a user to request keyword searches, file updated operations, and optionally additional functions such as adding new files and new keywords to the encrypted search indices. The network interface device 116 is, for example, a wired or wireless network adapter that communicatively couples the trusted client 104 to the untrusted servers 154A, 154B, and 180 through the data network 140.

The memory 120 includes one or more data storage devices including non-volatile data storage devices such as magnetic, optical, or solid-state drives and volatile data storage devices such as static and dynamic random access memory (RAM). In the configuration of FIG. 1, the memory 120 holds stored program instruction data 124, cryptographic key data 128, and a local index 132 that stores state information to enable the trusted client 104 to perform oblivious encrypted keyword search and file update operations. The stored program data 124 includes one or more software programs that enable the trusted client 104 to perform the operations described herein including, but not limited to, encrypting and decrypting file, keyword, and search index data, generating encrypted search indices, generating search queries and file update queries for encrypted search indices stored on the untrusted servers, and processing encrypted data received from the untrusted servers 154A, 154B, and 180. The cryptographic keys 128 include at least one set of secret data with a predetermined key size (e.g. 128 bits or 256 bits) that is known only to the trusted client 104 and not to the untrusted servers 154A and 154B or other third parties. The processor 108 generates the cryptographic keys using a secure key generation process that is otherwise known to the art and not described in further detail herein. The trusted client 104 uses a symmetric encryption and decryption scheme that is otherwise known to the art for secure encryption and decryption of data, such as the advanced encryption system (AES), to encrypt, decrypt, and re-encrypt data including encrypted search entries, encrypted file entries, and encrypted files.

The local index 132 includes state data pertaining to the keyword and file index data that are stored in the encrypted search indices 174 of the untrusted servers 154A and 154B along with lookup information needed to retrieve encrypted files from the file storage server 180. The local index 132 provides the state information that the trusted client 104 uses to perform keyword search and file update operations in an oblivious manner using the encrypted search indices in both of the untrusted servers 154A and 154B. Portions of the local index 132 are described below in more detail in FIG. 3.

The untrusted servers 154A and 154B are both digital computing devices. In the embodiment of FIG. 1, both of the untrusted servers 154A and 154B are configured with the same components that include a processor 158, a network interface device 162, and a memory 170. The processor 158, network interface device 162, and memory 170 are structurally similar to the processor 108, network interface 116, and memory 120 of the trusted client 104, respectively, although in some embodiments the untrusted servers 154A and 154B include more computational and storage capacity than the trusted client 104 to enable the untrusted servers 154A and 154B to provide services to a large number of clients that are each configured in the same manner as the trusted client 104 in FIG. 1.

In the untrusted servers 154A and 154B, the memory 170 holds stored program instructions 172 and encrypted search index data 174. The encrypted search index data 174 in the untrusted server 154A is not identical in content when compared to the encrypted search index data 174 in the untrusted server 154B, although both of the untrusted servers store encrypted keyword and file identifier data for a common set of keywords and encrypted files. The servers 154A and 154B execute the stored program data 172 to implement the operations described herein including, but not necessarily limited to, processing search queries received from the trusted client 104 to return encrypted search results from the encrypted search index 174, and receiving re-encrypted sets of keyword and file entries to update the encrypted search index data 174 in each of the untrusted servers 154A and 154B.

The untrusted servers 154A and 154B may or may not "collude" with one another. In the context of this application collusion refers to communication between multiple untrusted servers to share information about all of the search and file update operations that the trusted client performs. As described below, the search and file update methods described herein provide full obliviousness if the untrusted servers do not collude. Additionally, the methods described herein provide keyword search and file update obliviousness even if the untrusted servers 154A and 154B collude. Some of the search and file update methods described herein can also provide at least partial keyword search pattern and file update pattern obliviousness even when the untrusted servers 154A and 154B collude.

While the system 100 depicts two untrusted servers 154A and 154B for illustrative purposes, the systems and methods that are described herein can be extended to three or more servers that each stores a separate encrypted search index. The addition of servers improves the ability of the trusted client 104 to perform oblivious keyword search and file update operations even if the servers collude. One drawback of adding more servers is that the trusted client 104 needs to maintain additional information in a local index for additional untrusted servers and the trusted client 104 needs to generate additional search and file update operations for each additional server to maintain obliviousness using the techniques that are described below.

The untrusted file server 180 is another computing device that includes a processor 188, a network interface 192, and a memory 196 that holds stored program instructions 197 and one or more encrypted files 198. In the system 100, the untrusted file server 180 transmits encrypted data files 198 to the trusted client 104 in response to file retrieval requests and stores encrypted files that the trusted client 104 transmits to the untrusted file server 180 for storage. Some embodiments of the system 100 use more than one of the untrusted file storage servers 180. Some embodiments of the system 100 use oblivious file input and output techniques that are otherwise known to the art to reduce or eliminate the ability of the untrusted server 180 to determine access patterns to the individual encrypted files 198.

Figure 2:
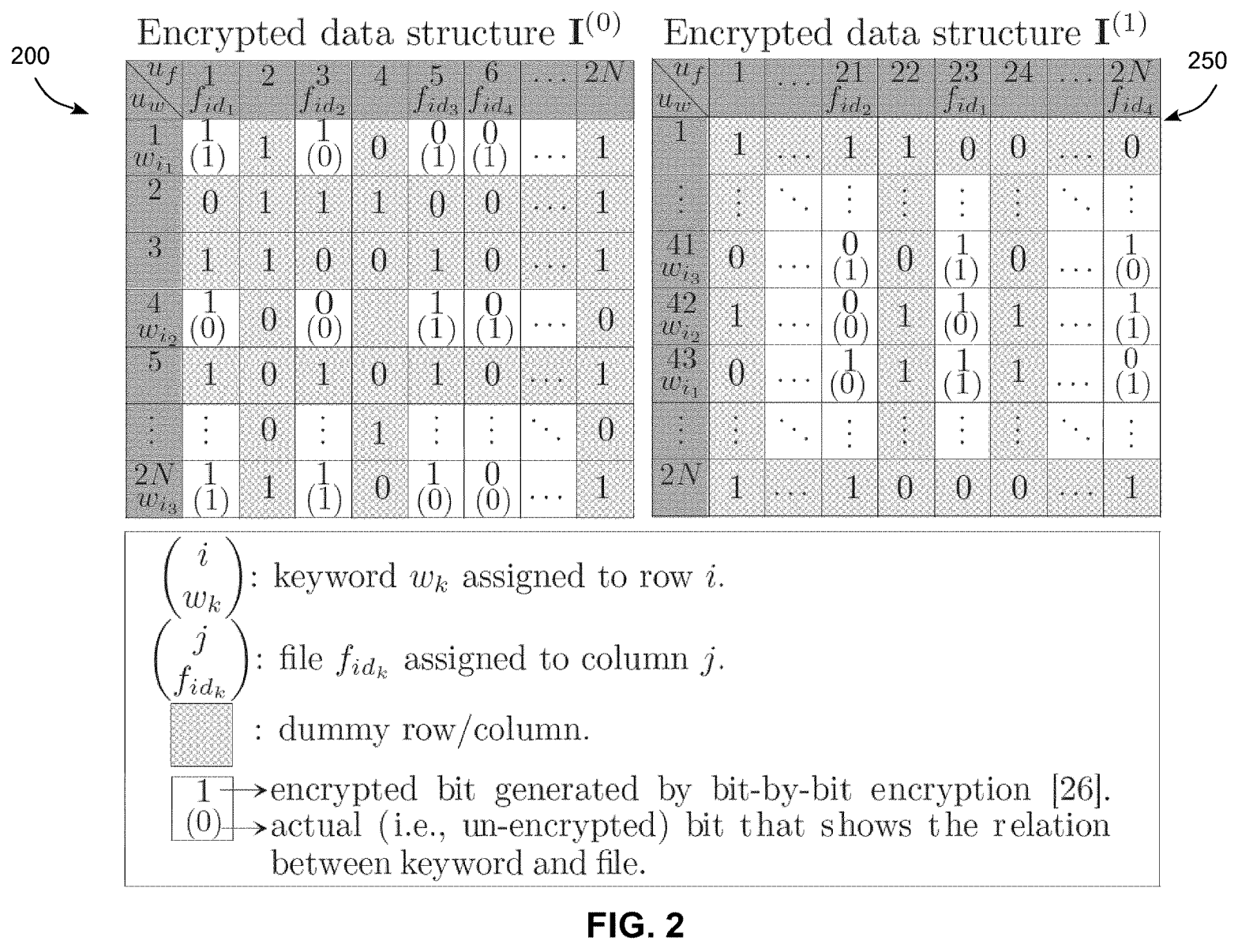

FIG. 2 depicts examples of two encrypted search indices 200 and 250 in more detail. Each of the search indices 200 and 250 is an embodiment of the encrypted search index data 174 that is stored in each of the untrusted servers 154A and 154B. In the system 100 the first untrusted server 154A stores a first encrypted search index (e.g. encrypted search index 200) in memory 170 as encrypted search index 174 and the second untrusted server 154B stores the second encrypted search index (e.g. encrypted search index 250) in memory 170 as the encrypted search index 174.

Each of the search indices 200 and 250 is generated with a square configuration with 2N×2N elements where the number N is a number corresponding to, at a minimum, the larger of the either the number of search keywords or the number of encrypted files that are referenced in the encrypted search indices 200 and 250. The 2N×2N search index size provides a large number of unoccupied (also referred to as "dummy") rows and columns that can accommodate newly added keywords and files in a dynamic symmetric searchable encryption scheme. Additionally, the large number of unoccupied rows and columns enables the system 100 to reposition rows and columns of data in a "swap" operation between the encrypted search indices 200 and 250 that is described in further detail below. The unoccupied rows and columns contain randomized data that is indistinguishable from the encrypted entries of occupied rows and columns from the perspective of the untrusted servers 154A and 154B. Additionally, during operation some occupied rows and columns that include valid encrypted data become "unoccupied" after the untrusted server accesses the row or column for an encrypted keyword search or encrypted file update operation, respectively.

In both of the search indices 200 and 250, an occupied row corresponds to a single keyword and an occupied column corresponds to a single encrypted file. The rows are accessed with numeric index values $u_t$ or $u_w$ and the columns are referred with numeric index values $v_j$ or $u_f$. Each row in the indices 200 and 250 is referred to as an encrypted search entry since the elements in the row, when decrypted, correspond to a set of search results for a keyword. Each column in the indices is referred to as an encrypted file entry since the elements in the column, when decrypted, correspond to a set of all keywords that are either present or absent from a file. While the encrypted search tables 200 and 250 and the other embodiments described herein describe "rows" as corresponding to search keywords and "columns" are corresponding to encrypted files, those of skill in the art will recognize that the same search index structure could be transposed to arrange keywords in columns and encrypted files in rows while operating in effectively the same manner as the embodiments described herein. As such, the use of the terms "rows" and "columns" herein should be understood to refer broadly to data structures that include encrypted search index entries corresponding to a keyword or an encrypted file where a "row" could be arranged horizontally or vertically and a "column" could similarly be arranged vertically or horizontally.

While the contents of the indices 200 and 250 are encrypted to prevent the untrusted servers 154A and 154B from determining the plaintext contents of a search index, each element at a given row and column includes an entry that, when decrypted, indicates if a given keyword corresponding to a particular row is or is not present in a given data file corresponding to a particular column. For example, if the keyword "cipher" corresponds to row value 25, then every entry in the encrypted search table at row 25 includes an encrypted value that, when decrypted, indicates if a particular file at a given column actually contains the keyword "cipher" or not. In one embodiment, a value of "1" in plaintext indicates that the keyword is present in the file and a value of "0" indicates that the keyword is not present in the file during a keyword search operation. Additionally, each occupied column of data in the encrypted search table includes a set of entries that, when decrypted, provide all of the search keywords that are present in a single encrypted file. When the trusted client 104 updates a file to add or remove keywords from the file, the trusted client 104 retrieves the column of encrypted data from at least one encrypted search index and modifies entries along the column to indicate changes to keywords that have been added or removed from the file in a file update operation. The encrypted entries in the search indices 200 and 250 also store binary 0 or 1 values, but due to encryption the untrusted servers 154A and 154B cannot determine the presence or absence of any particular keyword value in a file with any greater probability than random guessing.

When first generated, both of the encrypted search indices 200 and 250 encode the same sets of search keywords and the same sets of encrypted files. However, the contents of the search indices 200 and 250 are not identical for at least two reasons. First, the trusted client 104 uses different cryptographic keys as a basis for encrypting the individual entries in both of the encrypted search indices 200 and 250. Second, the specific row and column index values that map to particular keywords and encrypted files differ between the two encrypted search indices 200 and 250. For example, the keyword "cipher" may correspond to row index 25 in the table 200 but to a row index of 47 in the table 250 with no particular relationship between the two row index values. The encrypted search index tables 200 and 250 include different column index values for encrypted files as well.

Figure 3:
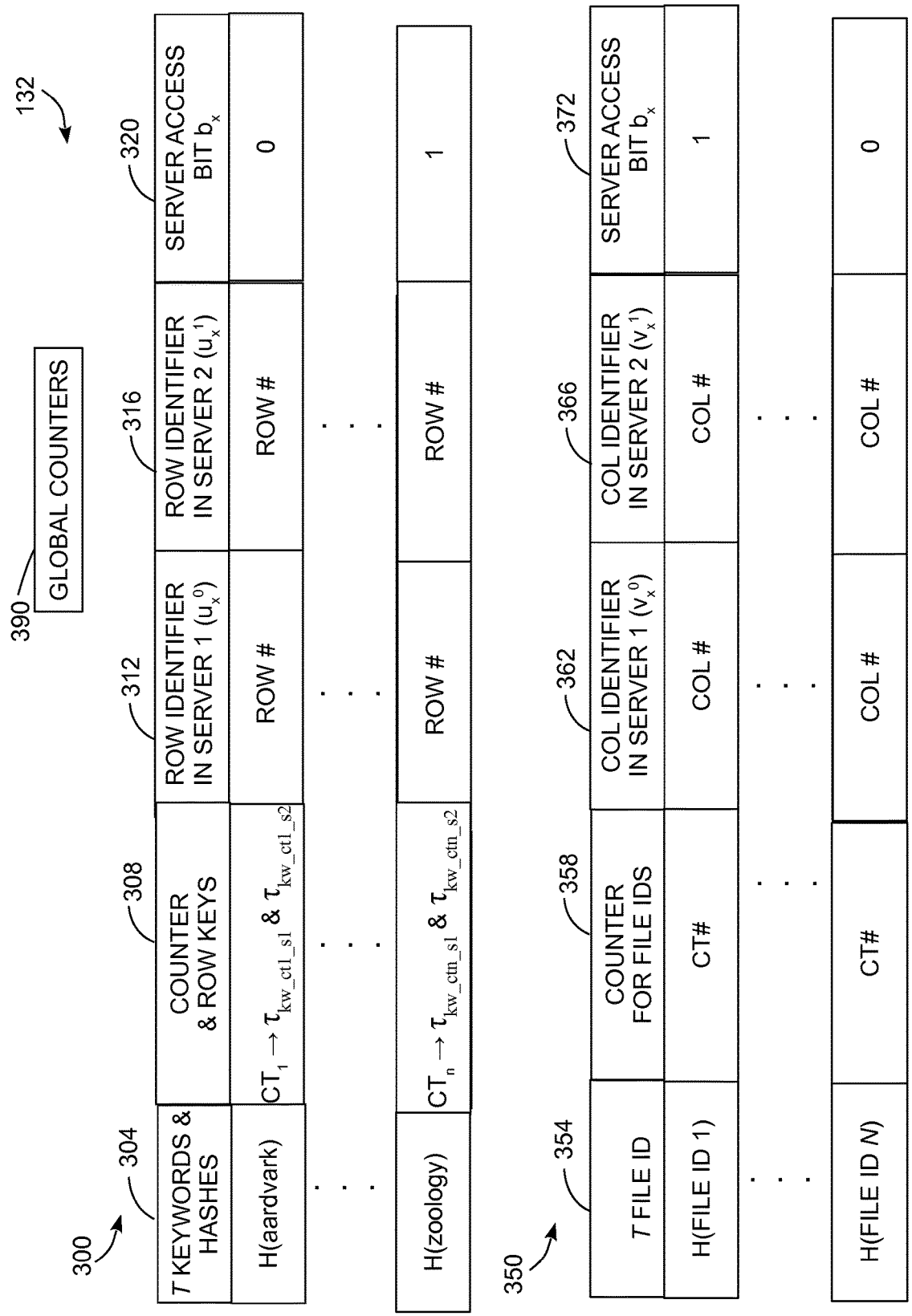
FIG. 3 is a diagram depicting an embodiment of a local index stored in a trusted client in the system of FIG. 1.

FIG. 3 depicts the contents of the local index 132 that is stored in the memory 120 of the trusted client 104. FIG. 3 includes two tables 300 and 350, where the table 300 stores local state data corresponding to the keywords in the encrypted search indices and the table 350 stores local state data corresponding to the file identifiers in the encrypted search indices. The table 300 includes a field for the keywords 304, which are stored either as plaintext or as hash values of the plaintext keywords, a counter field 308 that tracks the value of a global counter that was used in the most recent search query operation for each of the keywords, fields 312 and 316 that store numeric row identifiers to locate the keyword in two different encrypted search indices stored on two different servers, and a server access bit 320. The server access bit 320 that has two values (0 or 1) to identify either the server that most recently returned a search result for the keyword or, alternatively, to identify the server that should receive the next encrypted search query for the keyword when the trusted client 104 next generates an encrypted search query for the keyword. The table 350 includes a field for the file identifiers of the encrypted files 354, which are stored either as plaintext or as hash values, another field with a counter field 358 that tracks the value of a global counter that was used in the most recent file update request for each of the file identifiers, fields 362 and 366 that store numeric column identifiers to locate the file identifier in two different encrypted search indices stored on two different servers, and another server access bit 372. The server access bit 372 that has two values (0 or 1) to identify either the server that most recently performed a file update operation for the file identifier or, alternatively, to identify the server that should receive the next encrypted file update request for the file identifier when the trusted client 104 next generates an encrypted file update request for the file identifier. While FIG. 3 depicts the local index 132 as storing data in tables for illustrative purposes, another embodiment of the local index 132 uses a binary tree or other data structure to encode the local index. Additionally, the trusted client 104 optionally compresses the data in the local index 132 to reduce memory consumption. The local search index 132 also stores global counter values 390 that hold at least one counter value that is used in the re-encryption process for a new keyword search and file update operation to ensure that each re-encryption operation uses a counter value that has never been previously used to encrypt data in the system 100. The local index 132 is described in additional detail below in conjunction with the process of FIG. 5.

Figure 4:
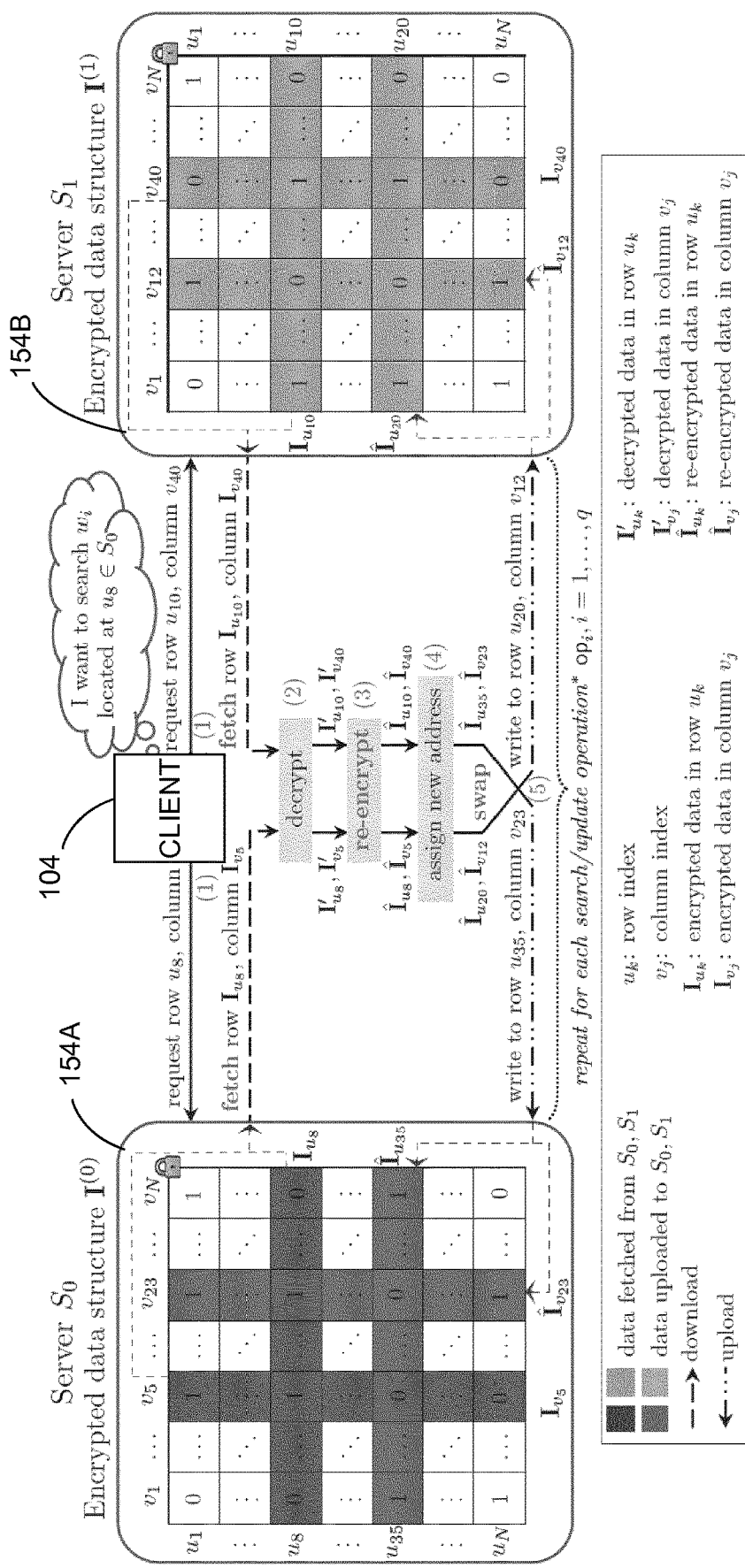
FIG. 4 is a diagram depicting a simplified operation of a trusted client to perform oblivious keyword search and file update operations in the system of FIG. 1.

FIG. 4 is a simplified diagram depicting an oblivious keyword search and file update operation in the system 100 performed by the trusted client 104 in conjunction with the untrusted servers 154A and 154B. First, the trusted client 104 generates two encrypted data structures, including address-data tuples ($u_x$, $I_{ux}$) of all possible search and update queries, and then send them to two non-colluding servers 154A and 154B, respectively. To perform a search or update operation, the client sends an encrypted search query and an encrypted file update request to each server. In the example of FIG. 4, one encrypted search query is a real operation while the other three are randomly selected (fake) queries (FIG. 2, step (1)). Each of the untrusted servers 154A and 154B sends back to the client corresponding address-data tuples that have been queried. After that, the client decrypts the received data to obtain the result (step (2)), and then re-encrypts them (step (3)). The trusted client 104 generates a new address-data tuple for each performed query by assigning re-encrypted data to a random address (step (4)). Finally, the trusted client 104 swaps such address-data tuples and writes them back to the other server (step (5)). That means new address-data tuple of the query being from untrusted server 154A will be written to untrusted server 154B and vice versa. The process of FIG. 4 makes each of the untrusted servers 154A and 154B observe a randomized data structure-access pattern with only one-time repetition unlinkable query that has been performed on the other untrusted server, provided that two servers do not collude.

Figure 5:
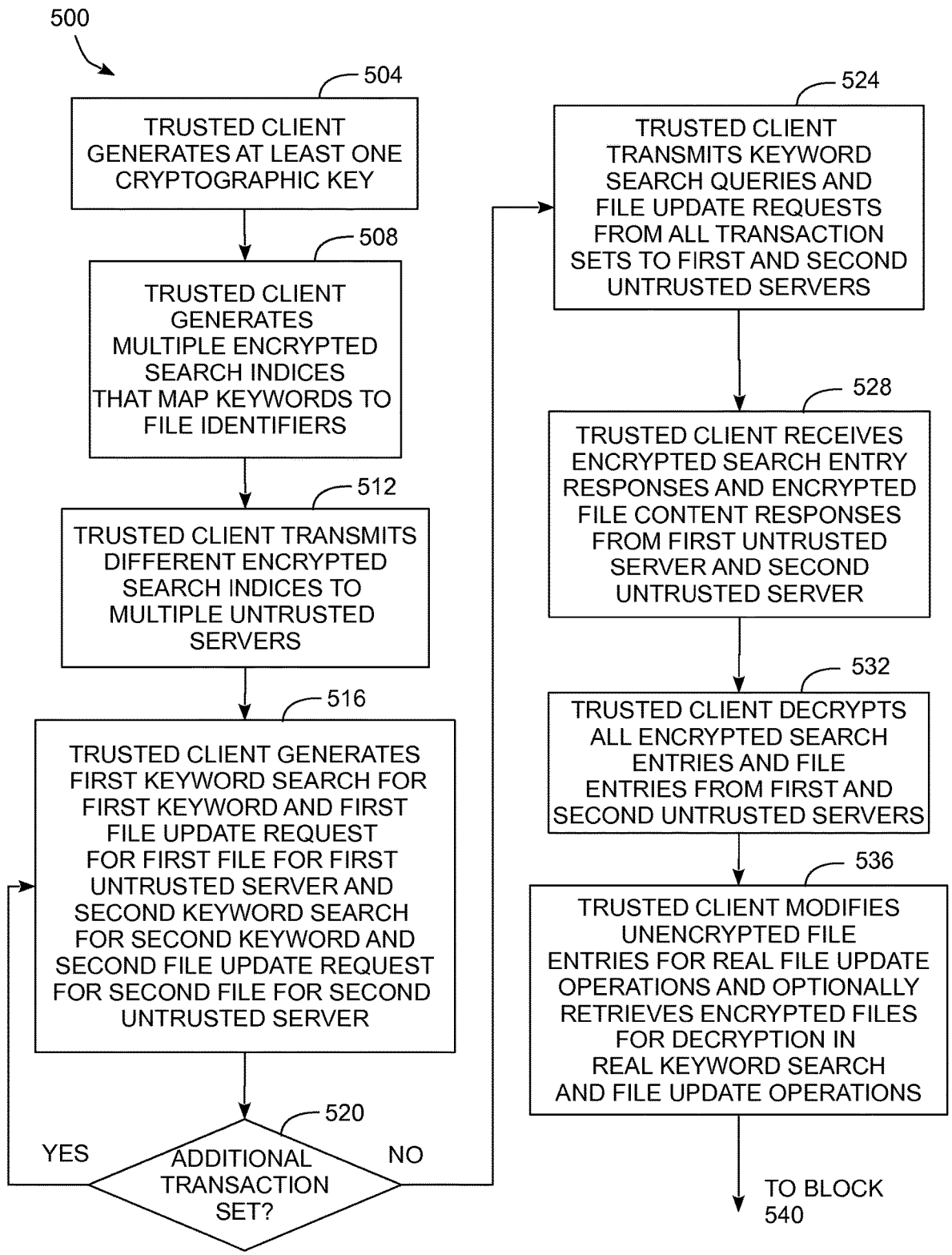
FIG. 5 is a block diagram depicting one embodiment of an oblivious search or file update operation using search index tables that are stored in two untrusted servers.
Figure 5:
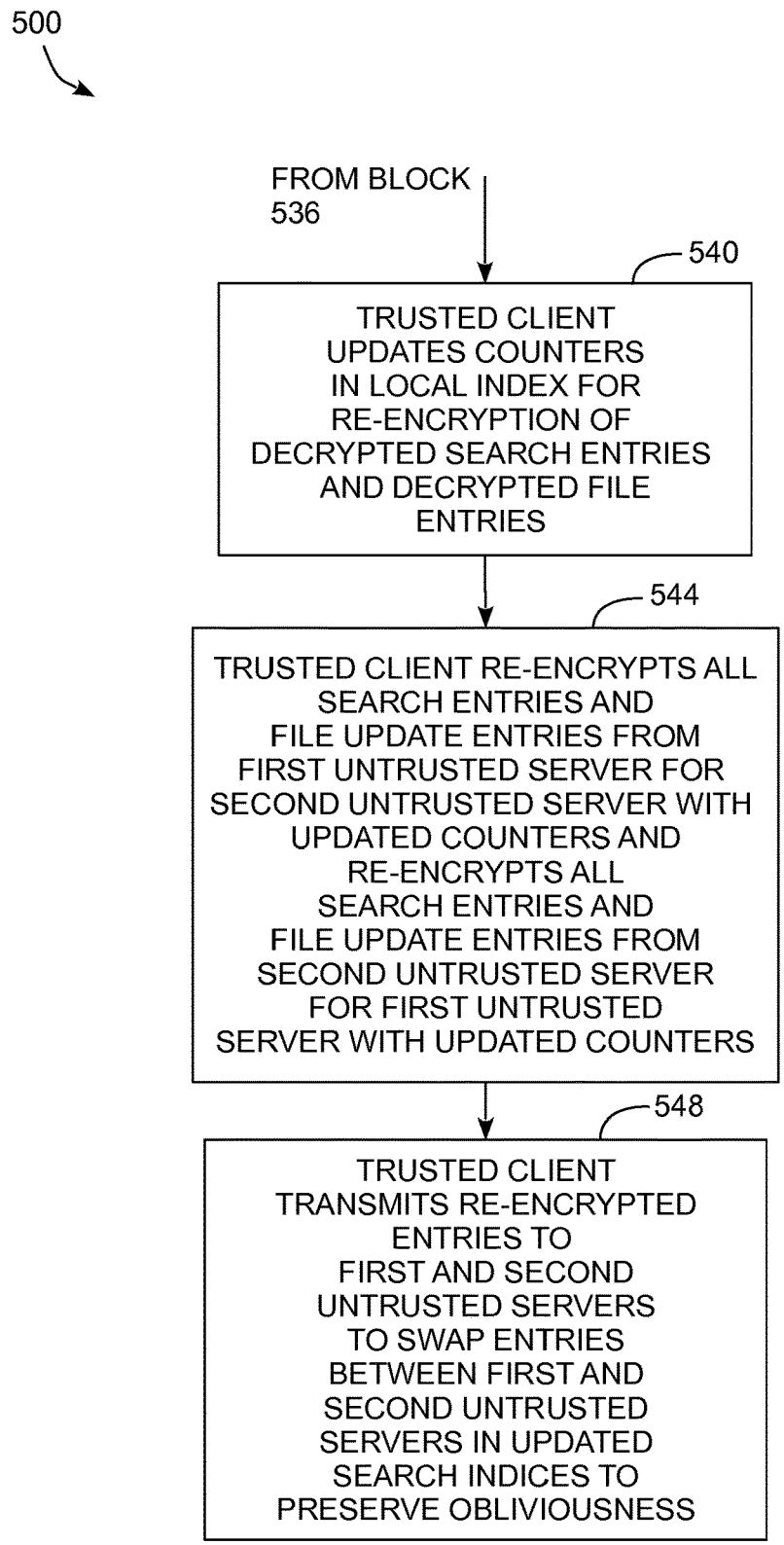

FIG. 5 depicts a process 500 for performing a combination of keyword search and file update operations using a trusted client that communicates with at least two untrusted servers that each store an encrypted search index to maintain keyword search and file update obliviousness, search pattern obliviousness, and file update pattern obliviousness. In the description below, a reference to the process 500 performing a function or action refers to the operation of at least one processor to execute stored program instructions to perform the function or action. The process 500 is described in conjunction with the system 100 of FIG. 1 for illustrative purposes.

The process 500 begins as the trusted client 104 generates cryptographic keys that serve as the basis for generating encrypted search indices and encrypted files (block 504). In the system 100, the processor 108 in the trusted client 104 uses a symmetric key generation algorithm that is known to the art to generate two symmetric keys that SK1 and SK2 that correspond to the search indices stored in the untrusted servers 154A and 154B, respectively. One example of a suitable symmetric key is a 128 bit key that is generated in a secure manner for use with the advanced encryption system (AES) cryptographic scheme or any other suitable cryptographic scheme. The symmetric keys SK1 and SK2 are independent of each other so data that are encrypted using key SK1 (or a key derived from SK1 as described below) cannot be decrypted by key SK2 and vice versa. The trusted client 104 stores the keys SK1 and SK2 in the cryptographic key data 128 in the memory 120 and the untrusted servers 154A and 154B, along with any other untrusted third-party computing devices including the untrusted storage server 180, do not have access to the keys SK1 and SK2. Additionally, no cryptographic key that is derived from either of the keys SK1 and SK2, such as the individual keyword keys τ that are described below, is ever shared with an untrusted computing device. In some embodiments, the trusted client 104 also generates a symmetric key SK3 that is used only for encrypting and decrypting file data for encrypted files 198 that are stored in the memory 196 of the untrusted file server 180. The key SK3 is not used in keyword search and file update operations.

The process 500 continues as the trusted client 104 generates multiple encrypted search indices that map keywords to file identifiers (block 508). In the embodiment of the system 100, the trusted client 104 generates two encrypted search indices using, for example, the table structure that of the encrypted search indices 200 and 250 from FIG. 2. In one embodiment, the trusted client 104 extracts keywords from the plaintext file data of each file in the encrypted files 198 using, for example, lexing and parsing processes that are known to the art, before the files are encrypted and sent to the untrusted file storage server 180. The trusted client 104 generates an unencrypted search index with a column corresponding to each file identifier and plaintext entries in each row corresponding to keywords that were found in the plaintext file. The trusted client builds the unencrypted search index with a new column for each plaintext file and new rows for any keywords that have not been previously extracted from files that are already present in the search index. The unencrypted search index also maps keywords into rows and file identifiers to columns as in the final encrypted search indices, but the contents of the unencrypted search index are of course not encrypted and the unencrypted search index does not have the 2N×2N size of the final encrypted search index tables.

To generate an encrypted search index with the table structure depicted in FIG. 2, the trusted client first generates a 2N×2N table of random binary values (0 or 1 in each entry) where N is, for example, the larger of the number of keywords or the number of file identifiers in the unencrypted search index. The trusted client 104 then randomly assigns each keyword from the unencrypted search index to a row index value in the 2N×2N table and records the randomly selected row number in the local index as depicted in FIG. 3 with the row identifiers 312 and 316 for each keyword in the first and second encrypted search index tables. Similarly, the trusted client randomly assigns file identifiers from the unencrypted search table to columns of the encrypted search table and records the randomly assigned column identifiers 362 and 366 for each file identifier. The trusted client 104 assigns each keyword to a unique row and each file identifier to a unique column in the encrypted search table.

To complete the encrypted search index, the processor 108 in the trusted client 104 initializes global counters, generates individual encryption keys for each keyword (row) in the encrypted table, and performs an element-by-element encryption process to place an encrypted version of each element in the original unencrypted search index into a corresponding entry of the encrypted search index. As depicted in FIG. 3, the trusted client 104 initializes the global counter value 390 for all of the keyword entries starting from 0, although another initial value can be used, and generates an individual encryption key τ for each entry in the local keyword index 300. The field 308 stores a copy of the most recently used counter value for each row, since during subsequent encrypted search query operations some rows will be accessed more than others and the counter value will be updated for different rows. The stored counter values in the field 308 enable the trusted client 104 to decrypt a search entry received from either of the untrusted servers 154A and 154B using the counter value that was used to encrypt the search entry. In one embodiment each key $\tau_{kw\_ctr\_key}$ for a given keyword (kw), counter value (ct), and symmetric key (key) is generated using all or a portion of the output of the cryptographically secure hash function: $\tau_{kw\_ctr\_key} \leftarrow H(kw\|ctr\|key)$, where the index 300 in FIG. 3 depicts example of a keyword "aardvark" (or the hash of the word as an input in another embodiment), a counter value of 4, and the key is either SK1 or SK2, where the local index 132 stores two different row keys τ that are each generated using one of the symmetric keys SK1 and SK2. The unique row keys ensure that each entry in a row corresponding to a keyword is encrypted especially for that particular keyword and symmetric key. Because each of the row keys τ is formed from a keyword, symmetric key, and a counter, the same counter value can be used one time for different row keys (e.g. all row keys can safely be initialized with a counter value of 0 when the search index is generated), although a counter value is never repeated for any individual set of search entry data when the trusted client 104 re-encrypts the data corresponding to a keyword, meaning that the same counter value is never used more than once for any individual row encryption key τ. The global counter values 390 change during each oblivious keyword search and file update operation to ensure that the same data in each row are re-encrypted to produce values that are not linked to previous versions of the row in the search table after every search or file update operation because the updated counter produces a new row key value. While FIG. 3 depicts the row keys for both of the untrusted servers 154A and 154B being stored in the local index 132 within the memory 120 of the trusted client 104 for illustrative purposes, in some embodiments the field 308 only stores the counter value and the keyword or hash of the keyword. The trusted client 104 regenerates the row keys only as needed so that the memory 120 does not need to store all of the row keys for all of the keywords. The trusted client 104 also initializes the global counter value 390 for the columns, which are also used in encrypting individual entries of the encrypted search table. In one embodiment, the global counter 390 can be a single counter that may update more than one time during each set of keyword search and file update operations to provide unique counter values, although other embodiments can use different counters for the keyword searches and file updates.

As depicted in FIG. 3, the entry 358 in the local index table 350 tracks the most recently used counter for each file identifier in the form of a number. As with the keyword search entries, the field 358 enables the trusted client 104 to identify the most recently used counter value for an individual file identifier to enable the trusted client 104 to decrypt a column of data received from either of the untrusted servers 154A and 154B using the counter value that was used to encrypt the file entry. When generating a new search index, the trusted client 104 assigns each file identifier a unique starting counter value, such as using numbers 0 to N for the N entries seen in FIG. 3. After the initialization, the trusted client 104 uses a global counter for file update operations that never repeats any of the initial counter values, such as a counter that increments starting from N+1, to serve as an updated counter for subsequent updates to file entries in the encrypted search indices. The trusted client 104 updates the global counters 390 in subsequent file update operations to ensure that every re-encryption operation described below produces an output that cannot be linked to any previous set of encrypted data that either of the untrusted servers 154A or 154B has stored in the encrypted search indices, even if the plaintext data in a row or column of the search index has not changed value.

As described above, the final encrypted search index table includes a large number of unoccupied entries, which are filled in with the random data that is indistinguishable from the encrypted entries of the occupied entries. The trusted client 104 uses the local index 132 to track which rows and columns actually contain useful encrypted information in the encrypted search index.

To generate each encrypted entry in the encrypted search index, the trusted client 104 selects each unencrypted element at a keyword/file index intersection from the plaintext search index and applies the encryption operation: $I[i, j] \leftarrow ENC_r(SearchEntry, FileID_{ctr})$ where $I[i, j]$ is the coordinate location in the encrypted table that receives the encrypted bit, SearchEntry is the plaintext single-bit value from the unencrypted search table, and $FileID_{ctr}$ is the counter for each file identifiers, each of which is initialized with a unique counter values as described above when the search indices are first generated. This encryption operation uses the unique row key for the keyword and symmetric key along with the counter values for the file identifiers. The trusted client 104 repeats the process above for each entry in the unencrypted search index to encrypt each entry individually in a "bit-by-bit" process to generate the encrypted search index.

The trusted client 104 repeats the process described above using the different sets of randomized row and column locations and using the different symmetric keys SK1 and SK2 for each row key to produce two different encrypted search index tables that each store the same keyword and file identifier data. As described above, the local index 132 stores the necessary global counter and counter tracking data, keyword-to-row mappings, and file identifier-to-column mappings to enable the trusted client 104 to retrieve, decrypt, and re-encrypt data from both of encrypted search indices.

Process 500 continues as the trusted client 104 transmits the encrypted search index tables to the untrusted servers 154A and 154B via the network 140 (block 512). In some embodiments the trusted client 104 deletes local copies of the unencrypted search index and the encrypted search indexes from the memory after transmission to the untrusted servers 154A and 154B, while the trusted client 104 retains the local index 132.

The processing of blocks 504-512 to generate the cryptographic keys and encrypted search indices for keywords and encrypted files typically occurs once prior to the trusted client performing multiple keyword searches and file update operations. The system 100 typically only needs to repeat the processing of blocks 504-508 in the event of a security breach or if the number of files and keywords that are stored in the encrypted search indices exceed the size of the search indices to regenerate new encrypted search indices.

The process 500 continues as the trusted client 104 performs the operations of generating a first encrypted search query for a first keyword and a first encrypted file update request for a first encrypted file and generating a second encrypted search query for a second keyword that is different than the first keyword and a second encrypted file update request for a second encrypted file that is different than the first encrypted file (block 516). In the trusted client 104, the processor 108 receives a request from a user via the I/O devices 112 or via execution of the program instructions 124 to perform at least one, and potentially more than one, of the following tasks: 1. Search for a keyword in the encrypted search indices of the untrusted servers 154A and 154B, or 2. Perform a file update operation due to changes in the contents of at least one encrypted file that includes making at least one addition or removal of a keyword from the corresponding file entry in the search index. The client 104 performs the two encrypted search query generation and the two file update request generation operations without regard to the underlying operation that the trusted client 104 actually requests during operation because the structure of the multiple encrypted keyword search queries and the multiple encrypted file update requests provides the keyword search and file update obliviousness and the search pattern and file update pattern obliviousness. In instances where a particular operation is not in response to a "real" request, the trusted client generates an encrypted keyword search query or an encrypted file access request using a randomly selected entry from the local index 132.

To generate the first and second encrypted search queries, the trusted client 104 identifies the entry for the keyword in the table 300 of the local index 132 and selects either the row number in field 312 for the first untrusted server (e.g. untrusted server 154A) or the row identifier in field 316 for the second untrusted server (e.g. untrusted server 154B) based on the value of the server access bit 320. During a query sequence for the same keyword, the trusted client 104 generates and sends encrypted search queries for the same keyword to the untrusted servers 154A and 154B in an alternating order to preserve the oblivious search pattern access property. When generating the first and second encrypted file search queries, the trusted client 104 selects two different keywords that have opposite server access bit values in the server access bit field 320 to ensure that one encrypted search query is directed to the first untrusted server 154A and the other encrypted search query is directed to the second untrusted server 154B. The trusted client generates the first and second encrypted file update requests in a similar manner by selecting one column identifier from field 362 for a first file identifier and another column identifier from column 366 for a second file identifier based on the sever access bit values in field 372 to ensure that there is one file update request transmitted to each of the untrusted servers 154A and 154B.

The trusted client 104 performs the operation of generating the first encrypted search query including a first row identifier of a first row in the first encrypted search index stored in the first untrusted server corresponding to the first keyword based on the local index 132 stored in the memory of the trusted client, and generating the second encrypted search query including a second row identifier of a second row in the encrypted search index stored in the second untrusted server corresponding to the second keyword based on the local index 132. The trusted client 104 also performs the operation of generating the first encrypted file update request including a first column identifier of a first column in the first encrypted search index stored in the first untrusted server corresponding to the first file identifier based on the index stored in the memory of the trusted client, and generating the second encrypted file update request including a second column identifier of a second column in the second encrypted search index stored in the second untrusted server corresponding to the second file identifier based on the index stored in the memory of the trusted client.

As described above, each encrypted search query is a numeric row identifier for the encrypted search table in one of the untrusted servers 154A and 154B, and each encrypted file update request is a column number for the encrypted search table in one of the untrusted servers 154A and 154B. While the row and column numbers are not a strictly "encrypted" values in that the row and column numbers are not cipher text of a plain text value, the information in the transmitted row and column numbers prevents the untrusted servers 154A and 154B from gaining any knowledge about the keyword or file beyond accessing encrypted information in a row or column of the encrypted search index, and are therefore referred to as being part of an encrypted search query or encrypted file update request.

The set of four operations described above with reference to block 516 including the generating of two encrypted search queries and the generating of two encrypted file update requests is referred to as a transaction set. During the process 500, the trusted client 104 optionally generates one or more additional transaction sets of four operations including generating of two encrypted search queries and the generating of two encrypted file update queries (block 520). Adding an additional transaction set results in a total of eight operations which provide improved search pattern obliviousness and file update pattern obliviousness if the two untrusted servers 154A and 154B are colluding with each other. If the untrusted servers are assumed to not be colluding with each other, then a single transaction set provides keyword search and file update obliviousness along with search pattern and file update pattern obliviousness.

If the trusted client generates one or more additional transaction sets of operations, the main constraint in each transaction set is that all of the encrypted search queries and the file update requests must be for different keywords and different file identifiers, respectively, and that there are a two encrypted search queries and two encrypted file update requests generated for each of the untrusted servers 154A and 154B. Additional transaction sets have similar constraints. The trusted client 104 performs the operations of generating a third encrypted search query for a third keyword that is different than the first keyword and the second keyword and a third encrypted file update request for a third encrypted file that is different than the first encrypted file and the second encrypted file. The trusted client 104 also performs the operation of generating a fourth encrypted search query for a fourth keyword that is different than the first keyword, the second keyword, and the third keyword and a fourth encrypted file update request for a fourth encrypted file that is different than the first encrypted file, the second encrypted file, and the third encrypted file.

The process 500 continues as the trusted client 104 transmits the encrypted search queries and encrypted file update requests to the untrusted servers 154A and 154B (block 524). In an embodiment in which the trusted client 104 generates two transaction sets, the trusted client 104 transmits the first encrypted search query and the first file update request along with a third encrypted search query and the third encrypted file update request to the first untrusted server 154A. The trusted client also transmits the second encrypted search query and the fourth encrypted search query and the second encrypted file update request and the fourth encrypted file update request to the second untrusted server 154B. the In some embodiments, the trusted client 104 randomizes the order of transmission of the operations in one or more transaction sets or takes other steps to ensure that the order and timing of data that are transmitted to either of the untrusted servers 154A and 154B does not reveal any useful information to the untrusted servers.

The process 500 continues as the trusted client 104 receives encrypted search entry and file update results from the encrypted search indices in the untrusted servers 154A and 154B (block 528). In the system 100, the untrusted servers 154A and 154B retrieve selected rows of the encrypted search index tables using the row identifiers in the encrypted search requests and retrieve selected columns of the encrypted search index tables using the column identifiers in the encrypted file update requests. The untrusted servers 154A and 154B transmit these encrypted row and column results to the trusted client 104 via the network 140.

In the two transaction set configuration, the trusted client receives a first encrypted search entry corresponding to the first encrypted search query, a third encrypted search entry corresponding to the third encrypted search query, a second encrypted file entry corresponding to the first file update request, and a third encrypted file entry corresponding to the third file update request from the first untrusted server 154A. Similarly, the trusted client receives a second encrypted search entry corresponding to the second encrypted search query, a fourth encrypted search entry corresponding to the fourth encrypted search query, a second encrypted file entry corresponding to the second encrypted file update request, and a fourth encrypted file entry corresponding to the fourth encrypted file update request from the second untrusted server 154B.

During the process 500, the trusted client 104 decrypts the encrypted search entries and encrypted file entries that are received from the untrusted servers (block 532). In the embodiment of the system 100, the trusted client uses a single row key $\tau$ to decrypt the individual elements of each encrypted file entry, and the trusted client 104 selects the appropriate row key $\tau$ corresponding to the either the first symmetric key SK1 or the second symmetric SK2 that was used to encrypt the entry based on the server bit access field 320 in the local index 132. The client 104 uses the row keys that correspond to the stored keyword counters in field 308 and the file identifier counters that are stored in the field 358 in the local index 132 to decrypt the encrypted search entry and file entry data from the untrusted servers 154A and 154B. The client 104 performs a similar process using a plurality of row keys τ for each entry each of the encrypted file entries since each entry in a columnar file entry is in a different row that corresponds to a different row key τ.

After decrypting the search entries and file entries from the untrusted servers, the trusted client 104 modifies any decrypted file entry columns in situations where the trusted client 104 actually performs a file update operation and optionally retrieves and decrypts encrypted files that include keywords in situations where the trusted client 104 actually performs a keyword search (block 536). To modify a file entry prior to re-encryption, the trusted client modifies the first decrypted file entry (or any other file entry that is to be modified) to add or remove at least one keyword from the decrypted file entry corresponding to a modification of file that corresponds to the first file identifier prior to generating the first re-encrypted file entry. As described above, to add a keyword the trusted client 104 identifies the proper entry corresponding to the row of the keyword based on the row identifier fields 312 or 316, depending upon the untrusted file server source of the file entry, and sets the value of the decrypted entry to "1" if the keyword is present or "0" if the keyword is absent from the file.

To complete a keyword search operation, the trusted client 104 identifies each entry in the plaintext of the decrypted file entry that has a value of "1" and then references the files 362 or 366 in the table 350 of the local index 132 to identify which file identifier matches the column identifier from the row. For example, if the entry is at column index 42 along the row and the search entry was retrieved from the second untrusted server 154B, the processor 108 searches the field 366 until the column identifier "42" is found, and the corresponding file identifier in field 354 corresponds to a file that contains the keyword. The trusted client 104 can optionally retrieve the encrypted file corresponding to this file identifier from the encrypted files 198 in the untrusted file server 180 and decrypt the encrypted file using the symmetric key SK3 to view and process the plaintext contents of the file that contains the keyword.

After decrypting the search entry and file entry data received from the untrusted servers 154A and 154B, the trusted client re-encrypts the decrypted data to generate a new sets of encrypted data where each new set of encrypted data is transmitted to a different untrusted server than was the original source of the data to perform a "swap" operation that maintains obliviousness in the system 100. To perform the operation, the trusted client 104 updates the counters in the local index 132 for re-encryption of the decrypted search entries and file entries (block 540). In one common configuration the processor 108 in the trusted client 104 merely increments one or more of the global counter values 390 by 1 to produce a new counter value that has never been used for encrypting the relevant data in any previous operation, and in some embodiments the processor 108 may increment a global counter 390 more than once during a set of search and file update operations to produce as many unique counter values as are required to re-encrypt search entry and file entry data. The updated counters enable the client 104 to produce new row key sets z based on the symmetric keys SK1 and SK2 for each row that is accessed in the file search operation, which enables the client 104 to re-encrypt both the decrypted search entries using a single newly generated row key for one of the symmetric keys SK1 and SK2 or to use all of the newly generated row keys to re-encrypt one element in each of the re-encrypted file entries. Additionally, the global counters for the file entries generate two or more unique counter values (e.g. prior global counter+1 and prior global counter+2) to ensure that each file entry corresponding to a different column in the encrypted search indices is re-encrypted with a unique counter value. This enables the trusted client 108 to produce updated encrypted search entries and file entries to update the encrypted search indices in the untrusted servers 154A and 154B if the trusted client 104 updates one or more entries in a file update operation or even if the trusted client 104 makes no changes to the decrypted search entry and file entry data.

The process 500 continues as the trusted client 104 re-encrypts the decrypted data corresponding to all of the search entries and all of the file entries (block 544). The re-encryption process uses a set of row keys that are generated using the symmetric key that is the opposite of the source of the original data as part of the "swap" operation in the process 500. For example, the trusted client generates a first re-encrypted search entry corresponding to the first keyword, which was received from the first untrusted server 154A associated with key SK1, based on the first decrypted search entry using the corresponding row key $\tau_{SK2}$ that is associated with the symmetric key SK2 of the second untrusted server 154B and the updated global counter value, which is stored in the field 308 for the corresponding keyword. Additionally, the trusted client 104 uses the updated global counter values for the file identifiers to re-encrypt the file entry data and stores the updated counter values in the field 358 of the table 350. In other words, trusted client 104 receives the first encrypted search result from the first server that was encrypted using a row key based on the symmetric key SK1 and re-encrypts using a different row key generated using the symmetric key SK2 along with the updated counters. The trusted client 104 uses a plurality of the row keys for all of the rows that are each derived from the second symmetric key SK2 to generate the first re-encrypted file entry corresponding to the first file identifier based on the first decrypted file entry, which corresponds to data received from the first untrusted server 154A, using the plurality of cryptographic keys associated with the second untrusted server, which are the newly generated row keys. Similarly, the trusted client 104 re-encrypts data originally received from the second untrusted server 154B by generating a second re-encrypted search entry corresponding to the second keyword based on the second decrypted search entry and a second re-encrypted file entry corresponding to the second file identifier based on the second decrypted file entry using the plurality of cryptographic keys associated with the first untrusted server, which are the row keys $\tau_{SK1}$ that are derived from the symmetric key SK1 associated with the first untrusted server 154A along with the updated counters. The trusted client performs the same process for each transaction set to re-encrypt the decrypted search entries and file entries.

As described above in FIG. 2, the encrypted search indices 200 and 250 include a large number of unoccupied or "dummy" rows and columns. Some of the entries in each set of encrypted and even the decrypted data include the "dummy" data from the server since the trusted client 104 only decrypts and re-encrypts valid entries on a bit-by-bit basis where the valid entries map to both a keyword and a file identifier using the local index 132. Other elements in the search entry rows and file entry columns include the "dummy" data that do not have any particular meaning but should not be used to link the newly re-encrypted data with previous sets of encrypted data that would have the same "dummy" entries. As part of the re-encryption process, the trusted client 104 randomly generates binary 1 and 0 values for each "dummy" entry in the re-encrypted search entries and file entries to ensure that the entire re-encrypted result cannot be linked to previous sets of encrypted data.

The process 500 continues as the trusted client 104 transmits the re-encrypted entries to the first and second untrusted servers to update the encrypted search indices on both of the untrusted servers 154A and 154B and to swap the re-encrypted search entry and file entry data between the servers 154A and 154B (block 548). The trusted client 104 transmits the re-encrypted search entries and file entries to each of the untrusted servers 154A and 154B with an updated row or column identifier that corresponds to a previously unoccupied location in the search index that is generally different than the original row or column index that the client 104 requested in blocks 516-524. For example, the trusted client 104 transmits the re-encrypted first search entry (originally received from server 154A) to a row identifier that is within the valid range of rows in the encrypted search table 174 on the server 154B (e.g. less than 2N using the example tables 200 and 250 of FIG. 2), but that is randomly selected to be a row identifier that is not present in any of the row identifiers 316 in the local index 132. This means that the swapped encrypted search entry is stored in an unoccupied row of the encrypted search index 174 of the second untrusted server 154B. The trusted client 104 updates the corresponding entry for the keyword in field 316 of the local index 132 to keep track of the location of the re-encrypted search entry in the second untrusted server 154B. The trusted client 104 also flips the server access bit 320 (0→1 or 1→0) to indicate that the most up to date re-encrypted search entry is stored on the untrusted server 154B. The trusted client 104 performs a similar operation for each of the re-encrypted search entries (rows) and the re-encrypted file entries (columns) to perform the swap operation that updates the encrypted search indices in both of the untrusted servers 154A and 154B and that keeps track of the locations of re-encrypted data for both of the search entries in table 300 and file entries in table 354 in the local index 132. After being updated, the local index 132 can be used for a subsequent iteration of the process 500 to perform keyword search and file update operations using the updated encrypted search indices stored on the untrusted servers 154A and 154B.

The process 500 is described in the context of performing oblivious keyword search and file update operations, but the process 500 can also perform additional update operations to the encrypted file indices of the untrusted servers 154A and 154B in an oblivious manner. For example, to add a new keyword that is not already present in the encrypted search indices, the trusted client 104 generates a search keyword request as described above in block 516, but the trusted client 104 intentionally selects an unoccupied row from the search index that does not match any of the keyword row values in the local index 132. The trusted client 104 receives random data from an unoccupied row in the encrypted file index, and during the re-encryption process described above in block 544 the trusted client 104 generates an actual row of encrypted search data corresponding to the keyword using bit-by-bit encryption in a similar manner to when the search index was first generated. The new entry then becomes the "re-encrypted" entry is then transmitted to the opposite server in the swap operation of block 548. The trusted client 104 also adds a new entry to the table 300 in the local index to track the newly added keyword. The untrusted servers 154A and 154B cannot distinguish between the new keyword addition operation and any of the other encrypted keyword search requests that the trusted client 104 performs during the process. A similar operation enables the trusted client 104 to add a new file identifier to the encrypted search tables. The trusted client 104 sends a file update request for an unoccupied column in the encrypted search index of a first server, generates the actual encrypted column of data during the re-encryption process to produce an encrypted mapping of the file identifier to the keywords, and transmits the newly generated column to the second untrusted server in the swap operation without either of the untrusted servers 154A or 154B being able to determine that the operation has added a new file to the encrypted search indices. Once again, the trusted client 104 adds a new entry to the table 350 in the local index 132 to track the newly added file.

As described above, the process 500 enables the system 100 to perform keyword search and file update operations with different degrees of obliviousness. Referring to the simplified example of FIG. 4, if the untrusted servers 154A and 154B do not collude, then each of the untrusted servers observes the following set of operations from the trusted client 104: 1. The trusted client 104 requests an encrypted keyword entry (row), the contents of which have only ever been requested once since the encrypted search index was formed or the row was overwritten during a prior operation; 2. The trusted client requests an encrypted file entry (column), the contents of which have only ever been requested once since the encrypted search index was formed or the column was overwritten during a prior operation; 3. The trusted client 104 subsequently updates the encrypted search index by overwriting a row with a new search entry that includes previously unknown encrypted data that cannot be linked to rows that have already been searched in the table and by overwriting a column with a new file entry that includes previously unknown encrypted data that cannot be linked to columns that have already been updated in the table. Furthermore, given the ability of the trusted client 104 to perform "fake" row and column accesses, the newly inserted row and column may not even correspond to a real keyword search or real file update operation.

In the example of FIG. 4 that is also described in FIG. 5 when the system 100 uses a single transaction set of two search queries and two file update requests (4 operations total), the system 100 provides both keyword search and file update obliviousness and search and file update pattern obliviousness. For keyword search and file update obliviousness, each of the untrusted servers 154A and 154B always receives requests for both a keyword search (row) and file update request (column) followed by newly generated row and column updates. This means that the untrusted servers 154A and 154B cannot determine if the client 104 is actually performing a keyword search, a file update, or both (theoretically the trusted client 104 can perform a completely "fake" operation that performs no real work but this scenario is unlikely in a practical system). Additionally, in isolation each untrusted server cannot track the encrypted queries and file update operations because each row or column in the search index is only accessed once and newly updated rows and columns cannot be linked to the previous contents of the encrypted search index. Thus, if the untrusted servers 154A and 154B do not collude, then the system 100 provides keyword search pattern and file update pattern obliviousness.

The obliviousness properties described above do not completely apply if the servers 154A and 154B can collude. In this situation, the system 100 still provides keyword search and file update obliviousness because the trusted client 104 still always performs keyword search and file update operations even if the untrusted servers 154A and 154B collude. However, the collusion enables the untrusted servers 154A and 154B to track the individual rows and columns accesses of the search indices, even if the trusted client 104 re-encrypts and swaps these entries because the colluding servers know the source-destination relationship between the rows and columns in every set of 4 operations. Thus, if the servers 154A and 154B collude, the system 100 loses the keyword search pattern and file update pattern obliviousness.

The process 500 of FIG. 5 provides a partial remedy that provides some degree of keyword search pattern and file update pattern obliviousness even if the servers 154A and 154B collude. As described in FIG. 5, if the trusted client performs a total of 8 operations (4 keyword search queries and 4 file update requests) using two transaction sets then the colluding servers 154A and 154B each observe two different row access and update operations and two different column access and update operations. The colluding servers 154A and 154B can determine that the pairs of rows and columns are related to each other, but can only guess with 50% accuracy as to the individual relationships between the exact rows and columns. If the process 500 performs more complex operations with additional transaction sets, this probability drops even lower (e.g. 33% with 3 transaction sets, 25% with 4 transaction sets). Additionally, adding more untrusted servers to the system 100 makes the tracking process more difficult. Thus, in a strict sense performing additional sets of keyword search query and file update operations does not provide perfect pattern obliviousness, but the embodiments described herein and the process 500 at least reduce the accuracy of attempts by the colluding servers 154A and 154B to track the keyword search and file update patterns of the trusted client 104.

An additional formal description of methods and alternative to the methods presented above is presented below. The key generation process of block 504:

---

Algorithm 1 K ← DOD-DSSE.Gen($1^\kappa$)

---

\# Generate keys to encrypt two data structures
1: $k_0$ ← ε.Gen($1^\kappa$), $k_1$ ← ε.Gen($1^\kappa$)
2: return K ← ($k_0$, $k_1$)

---

The initialization process of block 508:

---

Algorithm 2 (K, $T_w$, $T_f$) ← DOD-DSSE.Init($\kappa$, f, S)

---

1: Initialization: Set $T_w$, $T_f$ to be empty
 $I^{(b)}[i, j]$ ← 0, for all $1 \le i \le 2N$, $1 \le j \le 2N$ and for each b ∈ {0, 1}
 $C^{(b)}[i]$ ← 1, for all $1 \le i \le 2N$ and for each b ∈ {0, 1}
 $I_j.\mathcal{L}_b$ ← {1, 2, . . . , 2N} for each j ∈ {w, f} and b ∈ {0, 1}
2: K ← DOD-SSE.Gen($1^\kappa$)
3: Extract unique keywords w = ($w_1$, . . . , $w_{m'}$) from files
 f = ($f_{id_1}$, . . . , $f_{id_{n'}}$)
 \# Create unencrypted data structure $I^{(0)}$ for server $S_0$, $I^{(1)}$ for server $S_1$
4: for each $w_i$ ∈ {$w_1$, . . . , $w_{m'}$} do
5:  ($u_i^{(0)}$, $u_i^{(1)}$, $T_w$) ← DOD-DSSE.Assign($w_i$, $T_w$)
6:  for each $id_j$ ∈ {$id_1$, . . . , $id_{n'}$} do
7:   ($v_j^{(0)}$, $v_j^{(1)}$, $T_f$) ← DOD-DSSE.Assign($id_j$, $T_f$)
8:   if $w_i$ appears in $f_{id_j}$ then
9:    $I^{(0)}[u_i^{(0)}, v_j^{(0)}]$ ← 1, $I^{(1)}[u_i^{(1)}, v_j^{(1)}]$ ← 1
 \# Encrypt every rows of data structures $I^{(0)}$ and $I^{(1)}$
10: for each server $S_b$ ∈ {$S_0$, $S_1$} do
11:  $I^{(b)}[i, *]$ ← DOD-DSSE.Enc($I^{(b)}[i, *]$, i, b) for each row i ∈ {1, . . . , 2N}
12: Send $I^{(0)}$ to server $S_0$, $I^{(1)}$ to server $S_1$
13: return (K, $T_w$, $T_f$)

---

The keyword search queries and file update requests and re-encrypted data swaps of blocks 516-532 and 540-548:

---

Algorithm 3 id ← DOD-DSSE.Access (op, x, K, $T_w$, $T_f$, S)

---

\# Generate search and update queries
1: ({$u_j^{(b)}$, $\tilde{u}_j^{(b)}$}$_{j \in \{w, f\}, b \in \{0,1\}}$, β) ← DOD-DSSE.CreateQueries(x)
2: for each j ∈ {w, f} do
 \# Retrieve from each server 2 columns or 2 rows depending on index j
3:  for each server $S_b$ ∈ {$S_0$, $S_1$} do
4:   $I_{u_j}^{(b)}$ ← Read($u_j^{(b)}$) from $S_b$
5:   $I_{\tilde{u}_j}^{(b)}$ ← Read($\tilde{u}_j^{(b)}$) from $S_b$
 \# Decrypt retrieved row and column
6:  $I'_{u_j}^{(\beta)}$ ← DOD-DSSE.Dec($I_{u_j}^{(\beta)}$, $u_j^{(\beta)}$, β)
7:  $I'_{\tilde{u}_j}^{(\neg \beta)}$ ← DOD-DSSE.Dec($I_{\tilde{u}_j}^{(\neg \beta)}$, $\tilde{u}_j^{(\neg \beta)}$, ¬β)
8: if op = search then
9:  Extract column index from $I'_{u_w}^{(\beta)}$ as id ← ($y_1$, . . . , $y_l$), where $I'_{u_w}^{(\beta)}[y_\kappa]$ = 1 for each $y_\kappa$ ∈ {1, . . . , 2N} \ $Tf.\mathcal{L}_\beta$, $1 \le \kappa \le l$
10: else
11:  Update list of keywords in $I'_{u_f}^{(\beta)}$ corresponding to the file being updated
12:  for each j ∈ {w, f} do
 \# Update new address of non-dummy column and row data in the other server
13:   $T_j$ ← DOD-DSSE.UpdateT($T_j$, $u_j^{(\beta)}$, β, $u_j^{(\neg \beta)}$)
14:   $T_j$ ← DOD-DSSE.UpdateT($T_j$, $\tilde{u}_j^{(\neg \beta)}$, ¬β, $\tilde{u}_j^{(\beta)}$)
15:  Update cell values in $I'_{u_j}^{(\beta)}$ and $I'_{\tilde{u}_j}^{(\neg \beta)}$ to preserve keyword-file relations with changes at steps 13, 14.
16:  Create $I'_{u_j}^{(\neg \beta)}$, $I'_{u_j}^{(\neg \beta)}$ based on $I'_{u_j}^{(\beta)}$, ($I'_{\tilde{u}_j}^{(\neg \beta)}$) respectively to preserve keyword-file relation consistency in both servers.
 \# Increase all counter values in global counter arrays
17: $C^{(b)}[i]$ ← $C^{(b)}[i]$ + 1 for each b ∈ {0, 1} and i ∈ {1, . . . , 2N}
18: for each j ∈ {w, f} do
19:  for each server $S_b$ ∈ {$S_0$, $S_1$} do
 \# Re-encrypt retrieved data with newly updated counters
20:   $\hat{I}_{u_j}^{(b)}$ ← DOD-DSSE.Enc($I'_{u_j}^{(b)}$, $u_j^{(b)}$, b), $\hat{I}_{\tilde{u}_j}^{(b)}$ ← DOD.DSSE. Enc($I'_{\tilde{u}_j}^{(b)}$, $\tilde{u}_j^{(b)}$, b)
 \# Write re-encrypted data back to corresponding server $S_b$
21:   Write($u_j^{(b)}$, $\hat{I}_{u_j}^{(b)}$), Write($\tilde{u}_j^{(b)}$, $\hat{I}_{\tilde{u}_j}^{(b)}$) to $S_b$
22: return id Subroutines that are used in the algorithms presented above:

---

Subroutine 1 $(u_x^{(0)}, u_x^{(1)}, T) \leftarrow$ DOD-DSSE.Assign $(x, T)$

Assign item x to a random address in each server, and store assigned addresses in the hash table T:
    # Pick a random address from dummy set in each server
1:    for each b ∈ {0, 1} do
2:      $u_x^{(b)} \xleftarrow{\$} T.\mathcal{L}_b$
3:      $T.\mathcal{L}_b \leftarrow T.\mathcal{L}_b \setminus \{u_x^{(b)}\}$
    # Randomly assign server ID for x
4:    $b_x \xleftarrow{\$} \{0, 1\}$
    # Store assigned info of x in hash table
5:    T.insert $(H(x), \langle u_x^{(0)}, u_x^{(1)}, b_x \rangle)$
6:    return $(u_x^{(0)}, u_x^{(1)}, T)$

---

Subroutine 2 $(\mathcal{U}, \beta) \leftarrow$ Create Queries(x)

Generate 8 queries given an actual item x to be accessed, where x can be a keyword w or file f:
    # Get hash table entry for x and its info
1:    $j_x \leftarrow T_x.\text{get}(H(x))$
2:    $\beta \leftarrow T_x[j_x].b_x$
3:    $u_x^{(\beta)} \leftarrow T_x[j_x].u_x^{(\beta)}$
    # Select a random non-dummy row/column index $u_{\bar{x}}^{(\beta)}$.
    # If x is w then $\bar{x}$ is f and vice-versa
4:    $u_{\bar{x}}^{(\beta)} \xleftarrow{\$} \{1, \ldots, 2N\} \setminus T_{\bar{x}}.\mathcal{L}_\beta$
5:    for each j ∈ {w, f} do
    # Select a random non-dummy index from server $S_{\neg\beta}$
6:      $u_j^{(\neg\beta)} \xleftarrow{\$} \{1, \ldots, 2N\} \setminus T_j.\mathcal{L}_{\neg\beta}$
    # Randomly select dummy row & column indices in $S_0, S_1$
7:    for each b ∈ {0, 1} do
8:      $\tilde{u}_j^{(b)} \xleftarrow{\$} T_j.\mathcal{L}_b$
9:    return $(\mathcal{U}, \beta)$, where $\mathcal{U} = \{u_j^{(b)}, \tilde{u}_j^{(b)}\}_{j \in \{w, f\}, b \in \{0,1\}}$

---

Subroutine 3 $I'_u \leftarrow$ DOD-DSSE.Dec$(I_u, u, b)$

Decrypt a row / column $I_u$ using its address u and server b:
1:    if u is a row index then
2:      $\tau_u^{(b)} \leftarrow \text{KDF}(\kappa_b \| u)$
3:      for j = 1 ..., 2N do
4:        $I'_u[j] \leftarrow \varepsilon.\text{Dec}_{\tau u(b)} (I_u[j], j \| C^{(b)}[j])$
5:    else   # if u is a column index
6:      for i = 1 ..., 2N do
7:        $\tau_j^{(b)} \leftarrow \text{KDF}(\kappa_b \| i)$
8:        $I'_u[i] \leftarrow \varepsilon.\text{Dec}_{\tau j(b)} (I_u[i], u \| C^{(b)} [u])$
9:    return $I'$

---

Subroutine 4 $T \leftarrow$ DOD-DSSE.UpdateT(T, qIdx, b, nIdx)

Update item's address on server $S_{\neg b}$ by nIdx using its address qidx on server $S_b$ for hash table lookup:
    # Get hash table entry for qIdx in $S_b$
1:    $j_x \leftarrow T.\text{lookup(qIdx, b)}$
    # Update hash table with new entry nIdx and server b
2:    oIdx $\leftarrow T[j].u_x^{(\neg b)}$
3:    $T[j_x].u_x^{(\neg b)} \leftarrow$ nIdx
4:    $T[j_x].b_x \leftarrow \neg b$
    # Remove nIdx from dummy set $T.\mathcal{L}_{\neg b}$ and oIdx to it
5:    $T.\mathcal{L}_{\neg b} \leftarrow T.\mathcal{L}_{\neg b} \cup \{\text{oIdx}\} \setminus \{\text{nIdx}\}$
6:    return T

---

The embodiments described herein provide improvements to the operation of computing devices when performing symmetric searchable cryptographic searches that enable search pattern oblivious dynamic searchable symmetric encryption (SPO-DSSE) and Distributed Oblivious Data structure DSSE (DOD-DSSE). The systems and methods described above implement SPO-DSSE since non-colluding untrusted servers are oblivious to the keyword search and file update patterns. The systems and methods described above also implement DOD-DSSE since two or more untrusted servers have different encrypted search indices. A non-limiting list of the improvements includes: Practical Protection of Search Patterns, High Communication and Computation Efficiency, and High Security and Collusion Resistance. Practical Protection of Search Patterns: Compared to all previous traditional DSSE schemes, SPO-DSSE and DOD-DSSE are the first practical DSSE methods that can hide search pattern in an efficient manner. That is, all previous traditional DSSE schemes leak the search pattern, while SPO-DSSE and DOD-DSSE achieve oblivious search pattern without requiring processing and transmission of the entire encrypted index. High Communication and Computation Efficiency: SPO-DSSE and DOD-DSSE require re-encryption and transmission of only a small-constant portion of I (e.g., four rounds of interaction with a small transmission for the two server case), and therefore is fully practical. However, the only search pattern hiding alternative in some prior art solutions require the transmission of entire index for per search query between two non-colluding servers, and therefore is impractical for practical applications with even a moderate index size. SPO-DSSE and DOD-DESS are also much more communication and computation efficient than prior art ORAM methods, which require poly-logarithmic number of rounds and re-encryption/permutation between the trusted client and server. High Security and Collusion Resistance: Some prior art solutions, offer only a minimal level of search pattern protection, SPO-DSSE and DOD-DSSE achieve fully oblivious search pattern. Also, a variant of SPO-DSSE DOD-DSSE that includes eight or more transactions offers some resiliency against the collusion of a subset of multiple-servers, while the collusion of two servers in prior art solutions directly exposes the search pattern.

Figure 6A:
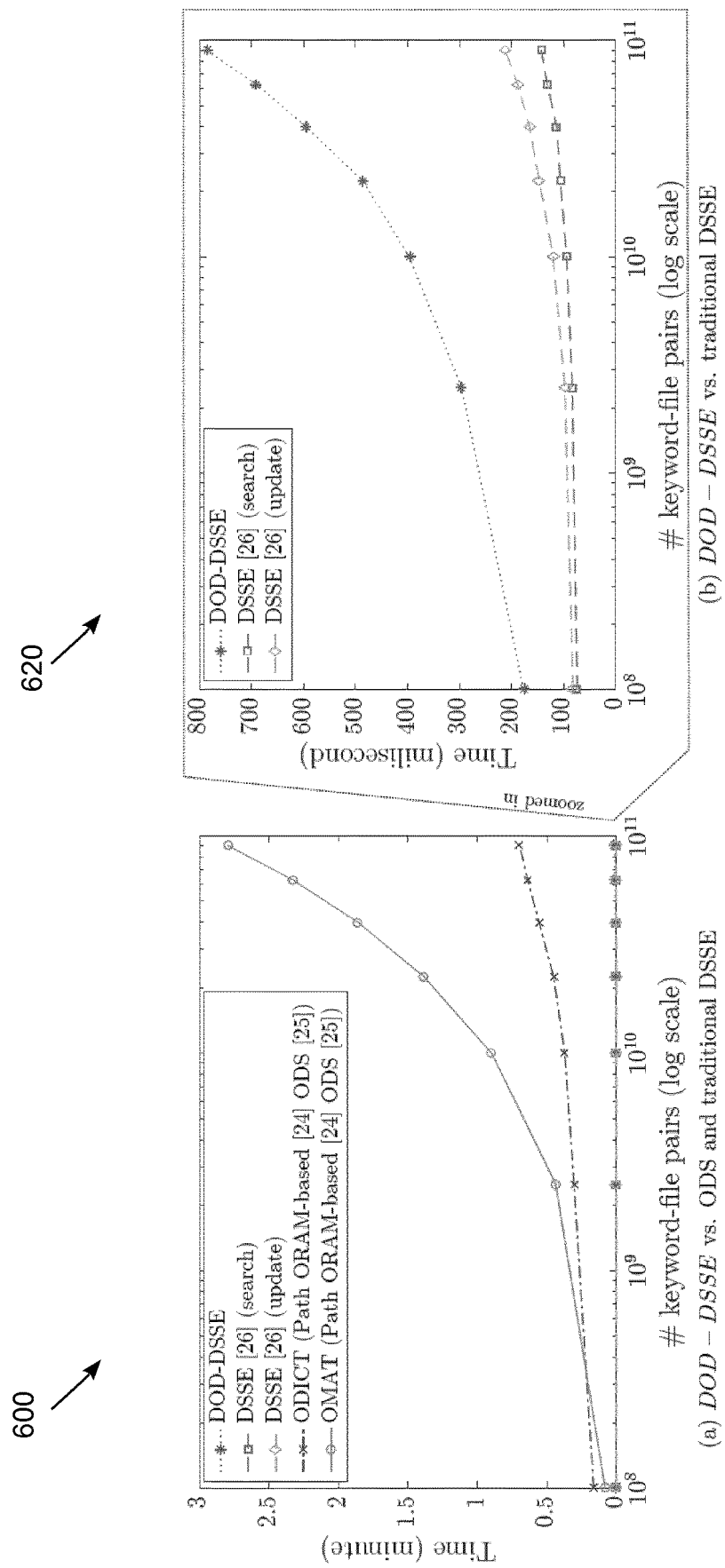
FIG. 6A is graph depicting the performance levels of one embodiment of the systems and methods described herein compared to prior art DSSE and ORAM systems using a low-latency network.
Figure 6B:
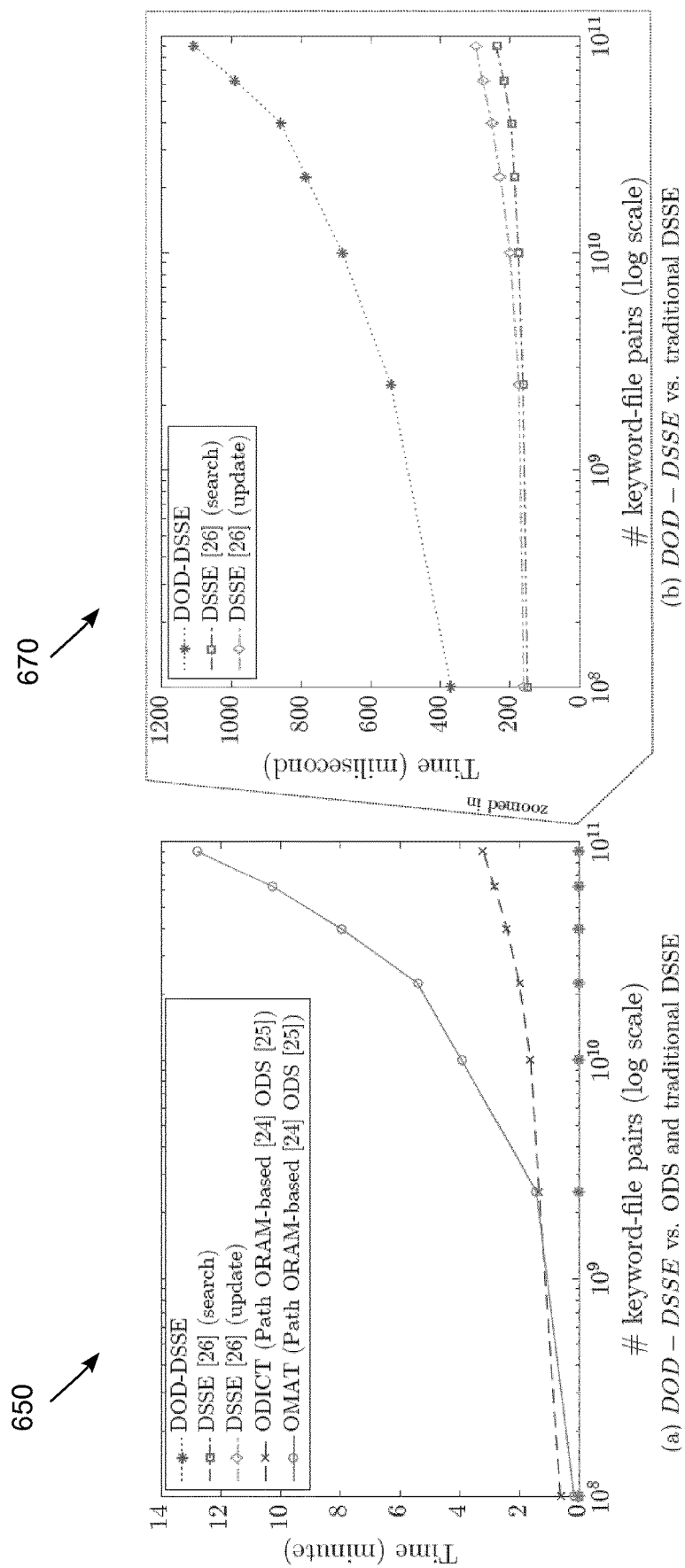
FIG. 6B is another graph depicting the performance levels of one embodiment of the systems and methods described herein compared to prior art DSSE and ORAM systems using a high-latency network.

FIG. 6A-FIG. 6C depict additional performance results of the embodiments described herein in comparison to prior art searchable encryption systems. FIG. 6A depicts a graph 600 of end-to-end cryptographic delay with in-state network latency, where the graph 620 is zoomed in view of DOD-DSSE in the graph 600, which is hard to observe in the graph 600. In the timing graphs, lower times indicate faster performance. The "DSSE" entries are prior art DSSE schemes that have fast performance but have none of the obliviousness properties of the DOD-DSSE embodiments described herein. The ODICT and OMAT graphs depict the performance levels of prior art oblivious RAM (ORAM) systems that do provide obliviousness but only do so at the cost of substantially slower performance that DOD-DSSE. Thus, as seen in graphs 600 and 620, the DOD-DSSE embodiment provides a strong combination of performance and obliviousness compared to the prior art.

The graphs 600 and 620 depict "in-state" network latency for an embodiment of the data network 140 that has comparatively low latency. FIG. 6B depicts another graph 650 of end-to-end cryptographic delay with a higher latency out-of-state network where the graph 670 is a zoomed in view of DOD-DSSE and traditional DSSE, which is hard to be observed in the graph 650. Once again, in a high-latency data network the DOD-DSSE embodiments described herein still provide strong performance levels that are noticeably superior to ODICT and OMAT while continuing to provide the obliviousness features that are absent from traditional DSSE (the latency only affects performance, not the obliviousness properties of DOD-DSSE).

FIG. 6C depicts a chart 680 that depicts further distinctions between traditional DSSE, ODICT and OMAT, and the DOD-DSSE embodiments described herein. Once again the chart 680 depicts the tradeoffs between DSSE (high performance but with no obliviousness properties), the ODICT and OMAT ORAM implementations (high obliviousness but low performance), and the DOD-DSSE embodiments described herein (a combination of improved obliviousness from DSSE and improved performance compared to ODICT and OMAT).

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed herein in the following claims.

What is claimed:

1. A method for searching and updating encrypted data comprising:
   generating, with a trusted client, a first encrypted search query for a first keyword and a first encrypted file update request for a first encrypted file;
   generating, with the trusted client, a second encrypted search query for a second keyword that is different than the first keyword and a second encrypted file update request for a second encrypted file that is different than the first encrypted file;
   transmitting, with the trusted client, the first encrypted search query and the first encrypted file update request to a first untrusted server;
   transmitting, with the trusted client, the second encrypted search query and the second encrypted file update request to a second untrusted server, the second untrusted server being different than the first untrusted server;
   receiving, with the trusted client, a first encrypted search entry corresponding to the first encrypted search query and a first encrypted file entry corresponding to the first encrypted file update request from the first untrusted server;
   receiving, with the trusted client, a second encrypted search entry corresponding to the second encrypted search query and a second encrypted file entry corresponding to the second encrypted file update request from the second untrusted server;
   decrypting, with the trusted client, the first encrypted search entry and the first encrypted file entry using a plurality of cryptographic keys associated with the first untrusted server to generate a first decrypted search entry and a first decrypted file entry;
   decrypting, with the trusted client, the second encrypted search entry and the second encrypted file entry using a plurality of cryptographic keys associated with the second untrusted server to generate a second decrypted search entry and a second decrypted file entry;
   generating, with the trusted client, a first re-encrypted search entry corresponding to the first keyword based on the first decrypted search entry and a first re-encrypted file entry corresponding to a first file identifier based on the first decrypted file entry using the plurality of cryptographic keys associated with the second untrusted server;
   generating, with the trusted client, a second re-encrypted search entry corresponding to the second keyword based on the second decrypted search entry and a second re-encrypted file entry corresponding to a second file identifier based on the second decrypted file entry using the plurality of cryptographic keys associated with the first untrusted server;
   transmitting, with the trusted client, the second re-encrypted search entry and the second re-encrypted file entry to the first untrusted server to update a first encrypted search index stored in the first untrusted server; and
   transmitting, with the trusted client, the first re-encrypted search entry and the first re-encrypted file entry to the second untrusted server to update a second encrypted search index stored in the second untrusted server.

2. The method of claim 1 further comprising:
   generating, with the trusted client, a third encrypted search query for a third keyword that is different than the first keyword and the second keyword and a third encrypted file update request for a third encrypted file that is different than the first encrypted file and the second encrypted file;
   generating, with the trusted client, a fourth encrypted search query for a fourth keyword that is different than the first keyword, the second keyword, and the third keyword and a fourth encrypted file update request for a fourth encrypted file that is different than the first encrypted file, the second encrypted file, and the third encrypted file;
   transmitting, with the trusted client, the third encrypted search query and the third encrypted file update request to the first untrusted server with the first encrypted search query and the first encrypted file update request;
   transmitting, with the trusted client, the fourth encrypted search query and the fourth encrypted file update request to the second untrusted server with the second encrypted search query and the second encrypted file update request;
   receiving, with the trusted client, a third encrypted search entry corresponding to the third encrypted search query and a third encrypted file entry corresponding to the third encrypted file update request from the first untrusted server;
   receiving, with the trusted client, a fourth encrypted search entry corresponding to the fourth encrypted search query and a fourth encrypted file entry corresponding to the fourth encrypted file update request from the second untrusted server;
   decrypting, with the trusted client, the third encrypted search entry and the third encrypted file entry using the plurality of cryptographic keys associated with the first untrusted server to generate a third decrypted search entry and a third decrypted file entry;
   decrypting, with the trusted client, the fourth encrypted search entry and the fourth encrypted file entry using the plurality of cryptographic keys associated with the second untrusted server to generate a fourth decrypted search entry and a fourth decrypted file entry;
   generating, with the trusted client, a third re-encrypted search entry corresponding to the third keyword based on the third decrypted search entry and a third re-encrypted file entry corresponding to a third file identifier based on the third decrypted file entry using the plurality of cryptographic keys associated with the second untrusted server;
   generating, with the trusted client, a fourth re-encrypted search entry corresponding to the fourth keyword based on the fourth decrypted search entry and a fourth re-encrypted file entry corresponding to a fourth file identifier based on the fourth decrypted file entry using the plurality of cryptographic keys associated with the first untrusted server;

transmitting, with the trusted client, the third re-encrypted search entry and the third re-encrypted file entry to the second untrusted server with the first re-encrypted search entry and the first re-encrypted file entry to update the second encrypted search index stored in the second untrusted server; and transmitting, with the trusted client, the fourth re-encrypted search entry and the fourth re-encrypted file entry to the first untrusted server with the second re-encrypted search entry and the second re-encrypted file entry to update the first encrypted search index stored in the first untrusted server.

3. The method of claim 1 further comprising:

updating, with the trusted client, a counter stored in an index in a memory of the trusted client;

generating, with the trusted client, a first updated encryption key corresponding to the first keyword based on a symmetric key associated with the second untrusted server, a hash of the first keyword, and the counter;

generating, with the trusted client, a second updated encryption key corresponding to the second keyword based on a symmetric key associated with the first untrusted server, a hash of the second keyword, and an updated second keyword counter;

generating, with the trusted client, the first re-encrypted search entry corresponding to the first keyword based on the first decrypted search entry using the first updated encryption key; and generating, with the trusted client, the second re-encrypted search entry corresponding to the second keyword based on the second decrypted search entry using the second updated encryption key.

4. The method of claim 3 further comprising:

generating, with the trusted client, the first re-encrypted file entry corresponding to the first keyword based on the first decrypted file entry and a first updated file counter using the plurality of cryptographic keys associated with the second untrusted server, the plurality of cryptographic keys associated with the second untrusted server including the first updated encryption key; and generating, with the trusted client, the second re-encrypted file entry corresponding to the second keyword based on the second decrypted file entry and a second updated file counter using the plurality of cryptographic keys associated with the first untrusted server, the plurality of cryptographic keys associated with the first untrusted server including the second updated encryption key.

5. The method of claim 1 further comprising:

generating, with the trusted client, the first encrypted search query including a first row identifier of a first row in the first encrypted search index stored in the first untrusted server corresponding to the first keyword based on an index stored in a memory of the trusted client;

generating, with the trusted client, the second encrypted search query including a second row identifier of a second row in the encrypted search index stored in the second untrusted server corresponding to the second keyword based on the index stored in the memory of the trusted client;

generating, with the trusted client, the first encrypted file update request including a first column identifier of a first column in the first encrypted search index stored in the first untrusted server corresponding to the first file identifier based on the index stored in the memory of the trusted client; and generating, with the trusted client, the second encrypted file update request including a second column identifier of a second column in the second encrypted search index stored in the second untrusted server corresponding to the second file identifier based on the index stored in the memory of the trusted client.

6. The method of claim 1 further comprising:

transmitting, with the trusted client, the second re-encrypted search entry to the first untrusted server to be stored in a randomly selected row in the first encrypted search index, an identifier of the randomly selected row being stored in an index stored in a memory of the trusted client to enable the trusted client to access the second re-encrypted search entry in a subsequent encrypted search query; and transmitting, with the trusted client, the second re-encrypted file entry to the first untrusted server to be stored in a randomly selected column in the first encrypted search index, an identifier of the randomly selected column being stored in the index of the trusted client to enable the trusted client to access the second re-encrypted file entry in a subsequent encrypted file update request.

7. The method of claim 1 further comprising:

modifying, with the trusted client, a first decrypted file entry to add or remove at least one keyword from the first decrypted file entry corresponding to a modification of file that corresponds to the first file identifier prior to generating the first re-encrypted file entry.

8. The method of claim 1 further comprising:

identifying, with the trusted client, an identifier of an encrypted file that contains the first keyword based on a first decrypted response;

transmitting, with the trusted client, a request for the encrypted file to a third untrusted server;

receiving, with the trusted client, the encrypted file from the third untrusted server; and decrypting, with a third cryptographic key stored in a memory of the trusted client, the encrypted file.

9. The method of claim 8 wherein the third untrusted server is different than either of the first untrusted server or the second untrusted server.

10. A trusted client computing device configured to search and update encrypted data comprising:

a memory configured to store an index;

a network interface device configured to transmit data to and receive data from a first untrusted server and a second untrusted server; and a processor operatively connected to the memory and the network interface, the processor being configured to:

generate a first encrypted search query for a first keyword based on an entry in the index stored in the memory corresponding to the first keyword and a first encrypted file update request for a first encrypted file based on an entry in the index stored in the memory corresponding to the first encrypted file;

generate a second encrypted search query for a second keyword based on an entry in the index stored in the memory corresponding to the second keyword, the second keyword being different than the first keyword, and a second encrypted file update request for a second encrypted file based on an entry in the index stored in the memory corresponding to the second encrypted file, the second encrypted file being different than the first encrypted file;

transmit the first encrypted search query and the first encrypted file update request to the first untrusted server;

transmit the second encrypted search query and the second encrypted file update request to the second untrusted server, the second untrusted server being different than the first untrusted server;

receive a first encrypted search entry corresponding to the first encrypted search query and a first encrypted file entry corresponding to the first encrypted file update request from the first untrusted server;

receive a second encrypted search entry corresponding to the second encrypted search query and a second encrypted file entry corresponding to the second encrypted file update request from the second untrusted server;

decrypt the first encrypted search entry and the first encrypted file entry using a plurality of cryptographic keys associated with the first untrusted server to generate a first decrypted search entry and a first decrypted file entry;

decrypt the second encrypted search entry and the second encrypted file entry using a plurality of cryptographic keys associated with the second untrusted server to generate a second decrypted search entry and a second decrypted file entry;

generate a first re-encrypted search entry corresponding to the first keyword based on the first decrypted search entry and a first re-encrypted file entry corresponding to a first file identifier based on the first decrypted file entry using the plurality of cryptographic keys associated with the second untrusted server;

generate a second re-encrypted search entry corresponding to the second keyword based on the second decrypted search entry and a second re-encrypted file entry corresponding to a second file identifier based on the second decrypted file entry using the plurality of cryptographic keys associated with the first untrusted server;

transmit the second re-encrypted search entry and the second re-encrypted file entry to the first untrusted server to update a first encrypted search index stored in the first untrusted server; and transmit the first re-encrypted search entry and the first re-encrypted file entry to the second untrusted server to update a second encrypted search index stored in the second untrusted server.

\* \* \* \* \*